(12) United States Patent
Dunham et al.

(10) Patent No.: US 10,852,205 B2
(45) Date of Patent: Dec. 1, 2020

(54) ARCHERY TRAINING METHODS USING SENSORY FEEDBACK SYSTEMS

(71) Applicants: Brady V. Dunham, Layton, UT (US); Jennifer S. Dunham, Layton, UT (US)

(72) Inventors: Brady V. Dunham, Layton, UT (US); Jennifer S. Dunham, Layton, UT (US)

( * ) Notice: Subject to any disclaimer, the term of this patent is extended or adjusted under 35 U.S.C. 154(b) by 0 days.

(21) Appl. No.: 16/413,055

(22) Filed: May 15, 2019

(65) Prior Publication Data
US 2019/0285492 A1 Sep. 19, 2019

Related U.S. Application Data

(62) Division of application No. 15/661,809, filed on Jul. 27, 2017, now Pat. No. 10,345,169.

(60) Provisional application No. 62/380,107, filed on Aug. 26, 2016.

(51) Int. Cl.
F41B 5/18 (2006.01)
G01L 5/102 (2020.01)
F41B 5/14 (2006.01)
G01L 19/08 (2006.01)
G01P 13/00 (2006.01)
G01L 5/04 (2006.01)

(52) U.S. Cl.
CPC ............ G01L 5/102 (2013.01); F41B 5/1403 (2013.01); F41B 5/148 (2013.01); F41B 5/1469 (2013.01); F41B 5/1476 (2013.01); G01L 5/04 (2013.01); G01L 19/08 (2013.01); G01P 13/00 (2013.01)

(58) Field of Classification Search
CPC ...... A41D 19/00; A63B 71/14; A63B 71/141; F41B 5/1469; F41B 5/1473; F41B 5/1476
See application file for complete search history.

(56) References Cited

U.S. PATENT DOCUMENTS

| | | |
|---|---|---|
| 3,262,126 A | 7/1966 | Price |
| 4,097,931 A | 7/1978 | Hirose |
| 4,134,383 A | 1/1979 | Flood |
| 4,179,613 A | 12/1979 | Koren |
| 4,572,153 A | 2/1986 | MacPherson |
| 4,689,887 A | 9/1987 | Colvin |
| 4,741,320 A | 5/1988 | Wiard |
| 4,813,150 A | 3/1989 | Colvin |
| 5,060,626 A | 10/1991 | Elliott |
| 5,435,292 A | 7/1995 | Armstrong |
| 5,566,951 A | 10/1996 | Dart et al. |
| 5,649,706 A | 7/1997 | Treat, Jr. et al. |
| 6,029,120 A | 2/2000 | Dilger |
| 6,191,574 B1 | 2/2001 | Dilger |
| 6,374,416 B1 | 4/2002 | Baranauskas |
| 6,898,971 B2 | 5/2005 | Dilz, Jr. |
| 7,086,298 B1 | 8/2006 | Colman |
| 7,211,011 B1 | 5/2007 | Sutherland |
| 7,284,546 B2 | 10/2007 | Maki |
| 7,337,773 B2 | 3/2008 | Simo |
| 7,371,021 B2 | 5/2008 | Ross, Jr. et al. |

(Continued)

Primary Examiner — John A Ricci
(74) Attorney, Agent, or Firm — Workman Nydegger

(57) ABSTRACT

An archery training method includes measuring a load applied to a bow hand holding a bow or applied to a release hand drawing a bow string of the bow, the measuring being performed while the bow string is drawn to a cocked positioned for firing an arrow; comparing through a computer processor the measured load to a predetermined value; and activating an output device to generate a notice based on the comparison between the measured load and the predetermined value.

12 Claims, 15 Drawing Sheets

(56) References Cited

U.S. PATENT DOCUMENTS

| | | |
|---|---|---|
| 7,780,363 B1 | 8/2010 | Holmberg |
| 8,079,353 B2 | 12/2011 | Davis et al. |
| 8,221,273 B2 | 7/2012 | Donahoe |
| 8,286,871 B2 | 10/2012 | Bay |
| 8,314,923 B2 | 11/2012 | York et al. |
| 8,316,551 B2 | 11/2012 | Gorsuch et al. |
| 8,733,168 B2 | 5/2014 | Donahoe et al. |
| 8,764,725 B2 | 7/2014 | Averbuch |
| 8,899,220 B2 | 12/2014 | Morris, II |
| 8,971,959 B2 | 3/2015 | Hunt et al. |
| 9,084,933 B1 | 7/2015 | Pope et al. |
| 9,970,730 B2 | 5/2018 | Thacker, Jr. |
| 2004/0014010 A1 | 1/2004 | Swensen et al. |
| 2005/0231362 A1 | 10/2005 | Pridmore, Jr. et al. |
| 2007/0068270 A1 | 3/2007 | Coffey |
| 2007/0151552 A1 | 7/2007 | Czemske |
| 2008/0146302 A1 | 6/2008 | Olsen et al. |
| 2009/0221388 A1 | 9/2009 | Giannetti et al. |
| 2011/0202152 A1 | 8/2011 | Barton et al. |
| 2012/0270186 A1 | 10/2012 | Singh |
| 2013/0098344 A1 | 4/2013 | Morris, II |
| 2013/0133213 A1 | 5/2013 | Gorsuch et al. |
| 2014/0110482 A1 | 4/2014 | Bay |
| 2014/0151965 A1 | 6/2014 | Garas |
| 2014/0156039 A1 | 6/2014 | Prinzel, III et al. |
| 2015/0019135 A1 | 1/2015 | Kacyvenski et al. |
| 2015/0090244 A1 | 4/2015 | Samuels et al. |
| 2017/0086519 A1 | 3/2017 | Vigano |
| 2017/0157488 A1 | 6/2017 | Migliorati |

ARCHERY TRAINING METHODS USING SENSORY FEEDBACK SYSTEMS

CROSS-REFERENCE TO RELATED APPLICATIONS

This application is a divisional of U.S. application Ser. No. 15/661,809, filed Jul. 27, 2017, which claims the benefit of U.S. Provisional Application No. 62/380,107, filed Aug. 26, 2016, which are incorporated herein by specific reference.

BACKGROUND OF THE INVENTION

1. The Field of the Invention

The present invention relates to archery training methods using sensory feedback systems and, more particularly, methods using sensory systems to detect and compare load and/or movements made or produced by an archer's bow hand and/or release hand while shooting a bow.

2. The Relevant Technology

Archery is becoming increasingly popular as a pastime and competitive sport. As the popularity grows, there is an increased need for aids to assist archers in perfecting their shot and improving their consistency. It is appreciated that small changes in an archer's form can lead to major misses. In order to perform consistently an archer needs to have the same movements with the bow hand (hand holding the bow) and release hand (hand releasing the string). One common problem is called hand torque. Hand torque happens when the archer is not gripping the bow correctly with their bow hand. The bow hand needs to hold the bow in the same way and apply the same amount of pressure while holding it steady. Each manufacturer's bow requires the bow to be held slightly different in order to prevent hand torque. This becomes a challenge even for experienced archers as they learn to shoot a new bow.

Furthermore, the archer's release hand needs to come to the same anchor point and have the same amount of pressure on the archer's face each time the bow is drawn. However, most archers struggle keeping the exact anchor point with the precise amount of pressure because of the strength it takes to hold the bow at full draw and the many different actions that take place during the shot process. When shooting the bow, an archer can either use their fingers or a release aid to fire the bowstring. Both methods come with their own challenges when learning how to become proficient. However, no matter the method of release a surprise shot is the goal. If the archer knows when the release will happen, they will tend to jerk and pull the shot. A good shot also has good follow through. When the bow is fired the release hand should go straight back and around the face. Bad follow through means the release hand is coming out and away from the face. Poor follow through also tends to happen as the arm fatigues during a shooting session.

Another common mistake is the way the archer holds the release aid. On one shot they might hold the release deep in their hand with a tight fist. In the next shot the hand might be more stretched out. This inconsistency not only affects the pressure of the hand holding the release aid but will change the archer's draw length and anchor points on their face. Furthermore, how and where the archer applies more pressure on the fingers holding the release aid will affect where and how the release aid attaches to the d-loop (d-loop is where the release aid attaches to the bowstring). For example, if on one shot the archer applies more pressure on the ring finger, the release will tilt up. If on the next shot pressure is applied more with the index finger, the release will be flatter. These differences can give variances in the string path once the bow string is released. The archer needs to hold the release aid the same on each shot so the arrow finds the same path.

Pre-loading the trigger of a release aid is also important when firing a bow. To be consistent the archer needs to use the same location on the finger or thumb when firing the trigger. If the archer is inconsistent in their pre-loading and location, then the timing of the shot will be inconsistent. This will promote the archer to be impatient, causing him/her to jerk the trigger. Other challenges also exist in producing archery shots that are accurate and consistent.

Accordingly, what is needed in the art are aids that assist archers in addressing one or more of the above challenges in producing archery shots that are accurate and consistent.

SUMMARY OF THE INVENTION

In one embodiment of the present invention, an archery sensory feedback system is provided for use with a hand of a user, the hand having a palm and fingers and having a front side and an opposing back side, the system including:
  a glove configured for placement on the hand of the user;
  at least one sensor disposed on the glove, the at least one sensor comprising a load sensor or a motion sensor that generates a use signal during use;
  a computer processor in electrical communication with the at least one sensor;
  non-transitory memory in electrical communication with the computer processor; and
  an output device in electrical communication with the computer processor and configured to generate a notice when activated;
  wherein the non-transitory memory is loaded with executable code that when executed by the computer processor performs the following functions:
    stores a predetermined value in the non-transitory memory;
    compares a value generated from the use signal produced by the at least one sensor to the predetermined value; and
    transmits a notice signal to the output device based on the comparison between the value generated and the predetermined value.

In one aspect, the glove has finger sleeves that are configured to receive at least some of the fingers of the hand, the at least one sensor comprising a load sensor disposed on a select one of the finger sleeves of the glove so as to overlay a select one of the fingers of the hand when the glove is worn on the hand.

In another aspect, the at least one sensor can comprise a load sensor disposed on the glove so as to overlay at least a portion of the back side of the hand when the glove is worn on the hand.

In another aspect, the at least one sensor can comprise a load sensor disposed on the glove so as to overlay at least a portion of the palm of the hand when the glove is worn on the hand.

In another aspect, the at least one sensor can comprise the motion sensor. The motion sensor can comprise an accelerometer or a gyroscope sensor.

In another aspect, the system can further include:
a mobile computer that includes the computer processor and the non-transitory memory and is spaced apart from the glove; and
a wireless transmitter disposed on the glove and configured for electrical communication with the mobile computer.

The mobile computer can comprise a smartphone. The mobile computer can include the output device. The output device can be secured to the glove and be configured to be in electrical communication with the mobile computer.

In another aspect, the output device can comprise a display, light source, vibrator, or sound generator.

In another aspect, the predetermined value can be generated by the computer processor and is based on one or more calibration signals produced by the at least one sensor.

In another aspect, the predetermined value can be an average of a plurality of values that are based on a plurality of calibration signals produced by the at least one sensor.

A second alternative embodiment of the present invention provides an archery sensory feedback system for use with a hand of a user, the hand having a palm and fingers and having a front side and an opposing back side, the system comprising:
a glove configured for placement on the hand of the user, the glove having a front side that is designed to cover at least a portion of the front side of the hand and an opposing back side that is designed to cover at least a portion of the back side of the hand when the glove is properly fitted on the hand;
at least one load sensor disposed on the back side of the glove; and
an electronic controller disposed on the glove and being configured to process signals from the at least one load sensor.

In one aspect, the glove can comprise:
a plurality of finger sleeves, each finger sleeve including at least a portion of the front side of the glove and a portion of the back side of the glove;
a wrist strap; and
a tie extending between the plurality of finger sleeves and the wrist strap, the tie including a further portion of the back side of the glove, the at least one load sensor being disposed on the tie or one of the plurality of finger sleeves.

In another aspect, the at least one load sensor can comprise a plurality of load sensors disposed on the back side of the glove.

In another aspect, a plurality of load sensors can be disposed on the front side of the glove.

In another aspect, a motion sensor can be disposed on the glove.

In another aspect, a wireless transmitter can be disposed on the glove in electrical communication with the controller.

In another aspect, an output device can be disposed on the glove, the output device comprising a display, light source, vibrator, or sound generator.

A third alternative embodiment of the present invention provides an archery sensory feedback system for use with a hand of a user, the hand having a palm and fingers and having a front side and an opposing back side, the system comprising:
a glove configured for placement on the hand of the user, the glove having a front side that is designed to cover at least a portion of the palm of the hand when the glove is properly fitted on the hand;
a first load sensor disposed on the front side of the glove so that when the glove is worn on the hand of the user, the first load sensor overlays at least a portion of the palm of the hand; and
an electronic controller disposed on the glove and being configured to process signals from the first load sensor.

In one aspect, when the glove is worn on the hand of the user, no load sensors overlay any of the fingers of the hand.

In another aspect, a motion sensor can be disposed on the glove.

In another aspect, the motion sensor can comprise an accelerometer or a gyroscope sensor.

In another aspect, a wireless transmitter can be disposed on the glove in electrical communication with the controller.

In another aspect, the glove can comprise a fingerless glove.

In another aspect, an output device is disposed on the glove, the output device comprising a display, light source, vibrator, or sound generator.

A fourth alternative embodiment of the present invention provides an archery training method that includes:
measuring a load applied to a bow hand holding a bow or applied to a release hand drawing a bow string of the bow, the measuring being performed while the bow string is drawn to a cocked positioned for firing an arrow;
comparing through a computer processor the measured load to a predetermined value; and
activating an output device to generate a notice based on the comparison between the measured load and the predetermined value.

In one aspect, the step of measuring the load can comprise:
securing a first load sensor to the bow hand so that the first load sensor is positioned over at least a portion of the palm of the bow hand; and
using the first load sensor to measure the load applied to the palm of the bow hand holding the bow while a bow string is in the cocked position.

In another aspect, the step of measuring the load can comprise using a load sensor disposed on a grip of the bow to measure the load applied to the palm of the bow hand holding the bow while the bow string is in the cocked position.

In another aspect, the step of measuring the load can comprise:
securing a second load sensor to the release hand so that the second load sensor is positioned over one of the index finger, middle finger or ring finger of the release hand; and
using the second load sensor to measure the load applied to the one of the index finger, middle finger or ring finger of the release hand produced by the bow string being in the cocked position.

In another aspect, the step of measuring the load can comprise using a load sensor disposed on an archery release aid engaging the bow string of the bow to measure the load applied to one of the index finger, middle finger or ring finger of the release hand by the bow string being in the cocked position.

In another aspect, the step of measuring the load can comprise:
securing a third load sensor to a back side of the release hand, the back side of the release hand being pressed against a face of the user when the bow string is in the cocked position; and using the third load sensor to measure the load applied to the back side of the release hand as a result of the back side of the release hand being pressed against the face of the user when the bow string is in the cocked position.

In another aspect, the notice can comprise a visual, audio, and/or tactile feedback.

In another aspect, the predetermined value can comprise a value based on a prior measured load applied to the bow hand or the release hand while the bow string is in the cocked position.

In another aspect, the method can further comprise:
measuring a movement of the bow hand or release hand while the bow string is being drawn to the cocked position or released from the cocked position; and
comparing through the computer processor the measured movement of the bow hand or the release hand to a predetermined value.

In another aspect, the step of measuring can comprise:
securing an accelerometer or gyroscope sensor to the bow hand or the release hand; and
using the accelerometer or gyroscope sensor to measure movement of the bow hand or the release hand while the bow string is being drawn to the cocked position or released from the cocked position.

A fifth alternative embodiment of the present invention provides an archery training method that includes:
measuring movement of a bow hand or a release hand of an archer while the archer is drawing a bow string to a cocked position for firing an arrow or releasing the bow string from the cocked position;
comparing through the computer processor the measured movement of the bow hand or the release hand to a predetermined value; and
activating an indicator to generate a notice based on the comparison between the measured movement and a predetermined value.

In one aspect, the step of measuring movement can comprise:
securing an accelerometer or gyroscope sensor to the bow hand or the release hand; and
using the accelerometer or gyroscope sensor to measure the movement of the bow hand or the release hand while the archer is drawing the bow string to the cocked position or releasing the bow string from the cocked position.

In another aspect, the step of measuring movement can comprise:
securing an accelerometer or gyroscope sensor to the bow or to an archery release aid engaging the bow string of the bow; and
using the accelerometer or gyroscope sensor to measure movement of the bow hand or the release hand while the archer is drawing the bow string to the cocked position or releasing the bow string from the cocked position.

A sixth alternative embodiment of the present invention provides an archery training method that comprises:
tracking movement of a bow hand holding a bow or a release hand holding a bow string through the use of an accelerometer or gyroscope sensor, the tracking being performed while an archer is drawing the bow string to a cocked position for firing an arrow or releasing the bow string from the cocked position;
displaying on a display device a representation of the direction of movement of the bow hand or the release hand while an archer is drawing the bow string to the cocked position or releasing the bow string from the cocked position based on signals obtained from the accelerometer or gyroscope sensor.

A seventh alternative embodiment of the present invention provides an archery sensory feedback system that comprises:
an archery bow having a grip;
at least one load sensor or motion sensor disposed on the bow; and
an electronic controller disposed on the bow and being configured to process signals from the at least one load sensor or motion sensor.

In one aspect, the at least one load sensor can be disposed on the grip of the bow.

An eighth alternative embodiment of the present invention provides an archery sensory feedback system that comprises:
an archery release aid configured for engaging and releasing a bow string of a bow, the archery release comprising:
a body having finger grips;
a catch disposed on the body and movable between a retention position and a release position; and
a trigger disposed on the body, the trigger engaging the catch such that movement of the trigger causes the catch to move from the retention position to the release position; and
at least one load sensor or motion sensor disposed on the archery release aid.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
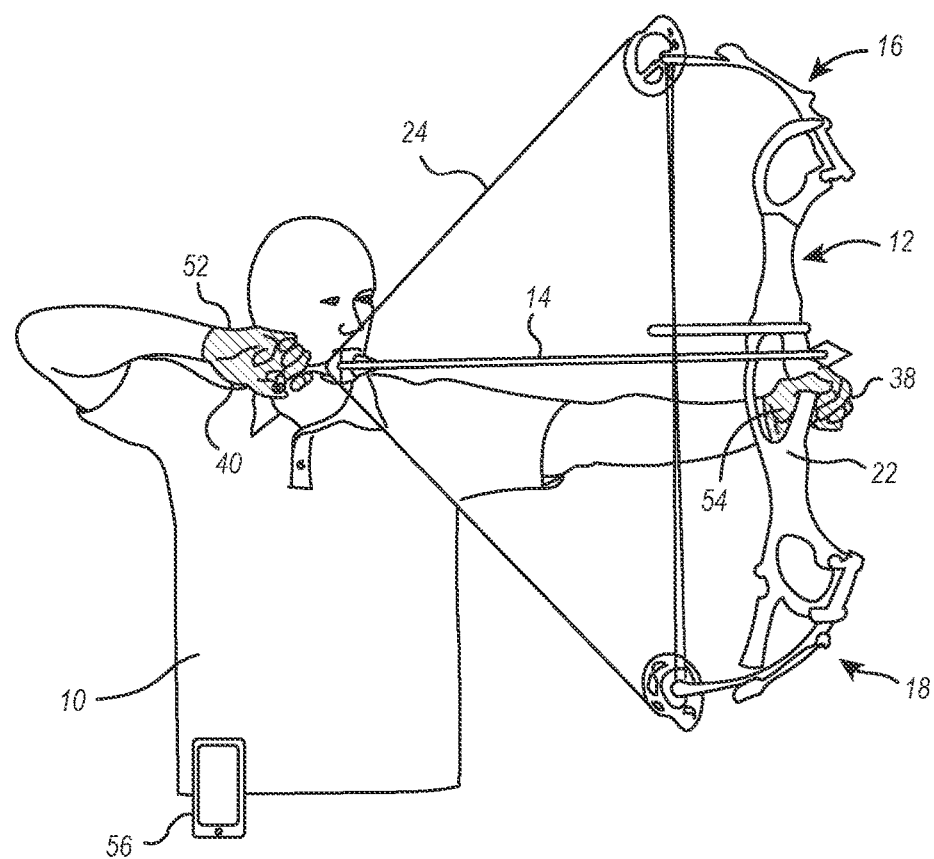
FIG. 1 is a perspective view of an archer firing a bow using one embodiment of an inventive archery sensory feedback system.

Before describing various embodiments of the present disclosure in detail, it is to be understood that this disclosure is not limited to the parameters of the particularly exemplified systems, methods, and/or products, which may, of course, vary. Thus, while certain embodiments of the present disclosure will be described in detail, with reference to specific configurations, parameters, features (e.g., components, members, elements, parts, and/or portions), etc., the descriptions are illustrative and are not to be construed as limiting the scope of the claimed invention. In addition, the terminology used herein is for the purpose of describing the embodiments, and is not necessarily intended to limit the scope of the claimed invention.

Unless defined otherwise, all technical and scientific terms used herein have the same meaning as commonly understood by one of ordinary skill in the art to which the present disclosure pertains.

Various aspects of the present disclosure, including systems, processes, and/or products may be illustrated with reference to one or more embodiments or implementations, which are exemplary in nature. As used herein, the terms "embodiment" and "implementation" mean "serving as an example, instance, or illustration," and should not necessarily be construed as preferred or advantageous over other aspects disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

It will be noted that, as used in this specification and the appended claims, the singular forms "a," "an" and "the" include plural referents unless the context clearly dictates otherwise. Thus, for example, reference to a "sensor" includes one, two, or more sensors. Similarly, reference to a plurality of referents should be interpreted as comprising a single referent and/or a plurality of referents unless the content and/or context clearly dictate otherwise. Thus, reference to "sensors" does not necessarily require a plurality of such sensors. Instead, it will be appreciated that independent of conjugation; one or more sensors are contemplated herein.

As used herein, directional terms, such as "top," "bottom," "left," "right," "up," "down," "upper," "lower," "proximal," "distal" and the like are used herein solely to indicate relative directions and are not otherwise intended to limit the scope of the disclosure and/or claimed invention.

Various aspects of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated. Furthermore, binding, coupling, attaching, connecting, and/or joining can comprise mechanical and/or chemical association.

To facilitate understanding, like reference numerals (i.e., like numbering of components and/or elements) have been used, where possible, to designate like elements common to the figures. Specifically, in the exemplary embodiments illustrated in the figures, like structures, or structures with like functions, will be provided with similar reference designations, where possible. Specific language will be used herein to describe the exemplary embodiments. Nevertheless, it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential). Furthermore, multiple instances of an element and or sub-elements of a parent element may each include separate letters appended to the element number. Furthermore, an element label with an appended letter can be used to designate an alternative design, structure, function, implementation, and/or embodiment of an element or feature without an appended letter. Likewise, an element label with an appended letter can be used to indicate a sub-element of a parent element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where multiple possibilities of values or a range a values (e.g., less than, greater than, at least, or up to a certain value, or between two recited values) is disclosed or recited, any specific value or range of values falling within the disclosed range of values is likewise disclosed and contemplated herein.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media and non-transitory memory as referenced herein. Non-transitory storage media/memory also embraces cloud-based storage systems and structures, although the scope of the invention is not limited to these examples of non-transitory storage media/memory.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present disclosure relates to archery sensory feedback systems and related methods that may be used to assist and/or train an archer in shooting an arrow from a bow. As discussed below in more detail, the inventive feedback system is designed to assist an archer in improving accuracy and/or consistency in shooting a bow by providing data to an archer relating to loads and/or movement of an archer's hands during the shooting process. The inventive systems and methods can also provide comparative data between preferred loads and/or movements of an archer's hand during firing and actual loads and/or movements of an archer's hands during firing. Based on this information, an archer is able to continually monitor his or her shooting process and make adjustments, as necessary, to optimize accuracy and/or consistency.

Figure 2:
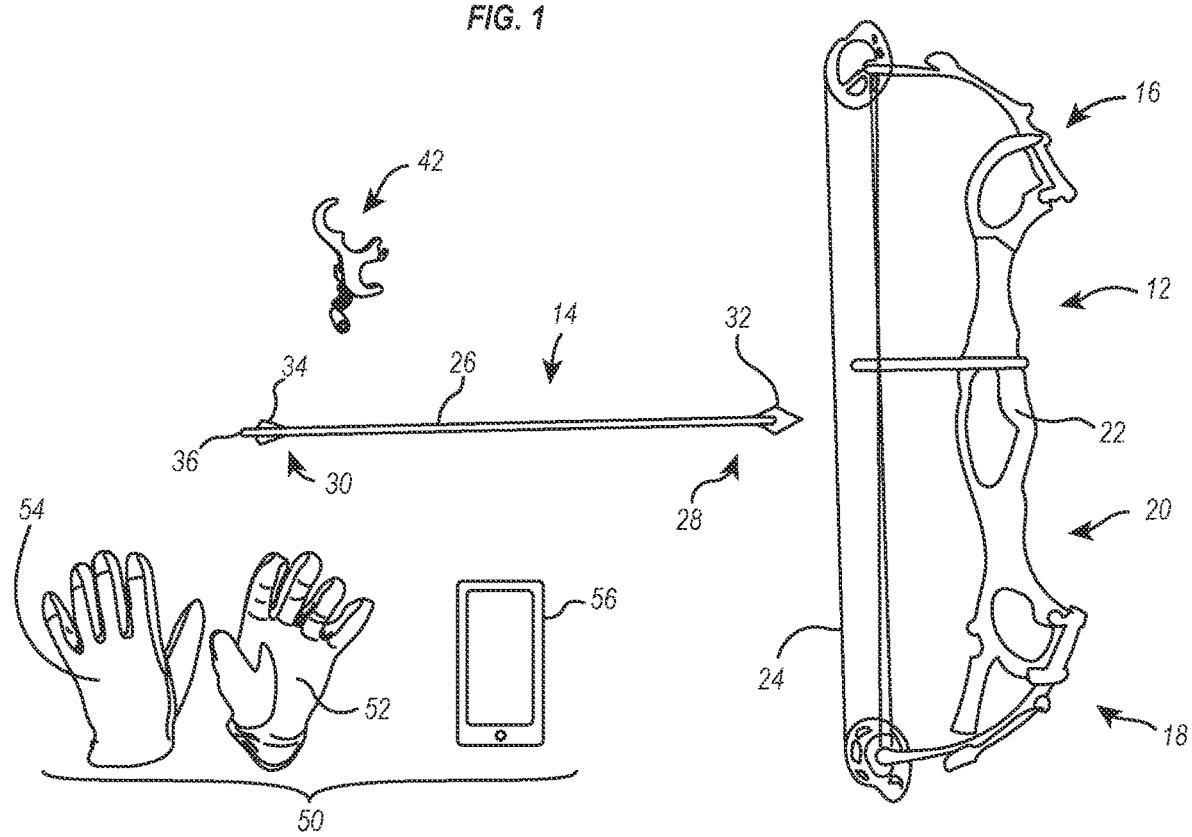
FIG. 2 is a perspective view of the archery sensory feedback system components used in FIG. 1 in combination with the bow and an arrow.

Depicted in FIGS. 1 and 2 is a bow 12 and an arrow 14. Bow 12 comprises an upper limb 16, a lower limb 18 and a riser 20 that extends therebetween. A grip 22 is formed or otherwise disposed on riser 20. Bow 12 also includes a tensioned bow string 24 that extends between limbs 16 and 18. In the drawings, bow 12 is depicted as a compound bow. However, the present invention can also be used in association with other bows used to shoot arrows such as, for example and not by limitation, recurve bows, reflex bows, self bows, longbows, flatbows, composite bows, and take-down bows.

Arrow 14 generally comprises a shaft 26 that extends between a leading end 28 and a tail end 30. An arrow head 32 is disposed at leading end 28 while fletching 34 is disposed at tail end 30. Disposed at a terminus of tail end 30 is a nock 36. Nock 36 has a groove formed thereon to receive bow string 24. It is appreciated that arrow 14 can come in a variety of different sizes and can have any number of different arrow heads 32 disposed on shaft 26.

FIG. 1 illustrates one example of how an archer 10 shoots arrow 14 using bow 12. In general, archer 10 holds bow 12 at grip 22 with a bow hand 38 and holds bow string 24 with a release hand 40. Archer 10 can hold bow string 20 by either directly manually gripping nock 36, which is engaging bow string 24, or, as discussed below in more detail, by utilizing a release aid 42 (FIG. 2). Release aid 42 releasably engages bow string 24 and is held by release hand 40. During use, arrow 14 is situated such that a portion of arrow 14 rests on release hand 40 or on a support portion of bow 12 while nock 36 centrally engages bow string 24. Archer 10 then extends bow hand 38 forward, which is holding bow 12, while release hand 40 pulls back on bow string 24, thereby bending bow 12 and further tensioning bow string 24. Bow string 24 is withdrawn by release hand 40 to a cocked position which is also known in the art as a full drawn position. In the cocked or full drawn position, release hand 40 rests against anchor points on the face of the archer to both stabilize release hand 40 and facilitate aiming. When bow string 24 is released by release hand 40, bow string 24 springs back into its resting position and consequently transfers a force into arrow 14, thereby shooting arrow 14 out of bow 12.

Figure 3:
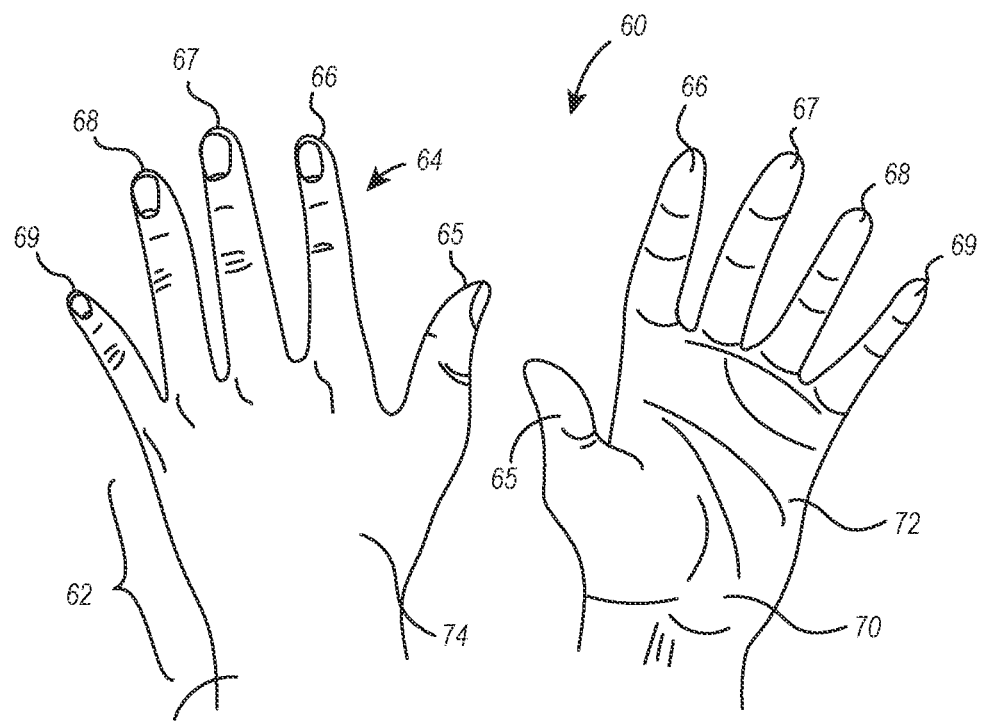
FIG. 3 is a front and back view of a hand of the archer shown in FIG. 1.

For purposes of clarity in the below discussion of the inventive archery sensory feedback system, it is helpful to clearly understand the elements of bow hand 38 and release hand 40. For example, depicted in FIG. 3 is a hand 60 that can function either as bow hand 38 or release hand 40. That is, bow hand 38 can be the right hand or left hand while release hand 40 is the hand opposite bow hand 38. Although only a left hand is depicted, it is understood that the opposite right hand has the same elements as the left hand discussed herein. Hand 60 comprises a pad 62 that extends from a wrist 63 and also includes five fingers 64 that project from pad 62. Fingers 64 include a thumb 65, index finger 66, middle finger 67, ring ringer 68 and pinky finger 69. Hand 60 has an inside face 70 which is the side of hand 60 to which fingers 64 naturally bend. Inside face 70 extends from wrist 63 to the tips of each finger 64. The portion of inside face 70 on pad 62 is a palm 72. Hand 60 also has a back side 74 which is the side of hand 60 opposite of inside face 70 and extends from wrist 63 to the tips of each finger 64.

Figure 4:
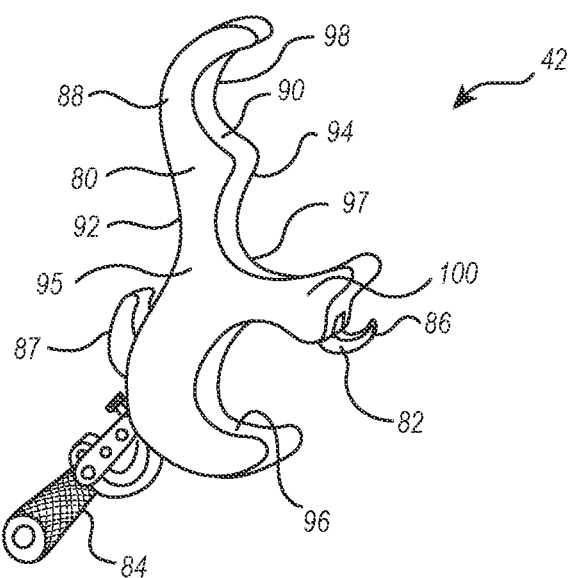
FIG. 4 is a perspective view of a release aid shown in FIG. 2.
Figures 5, 6:
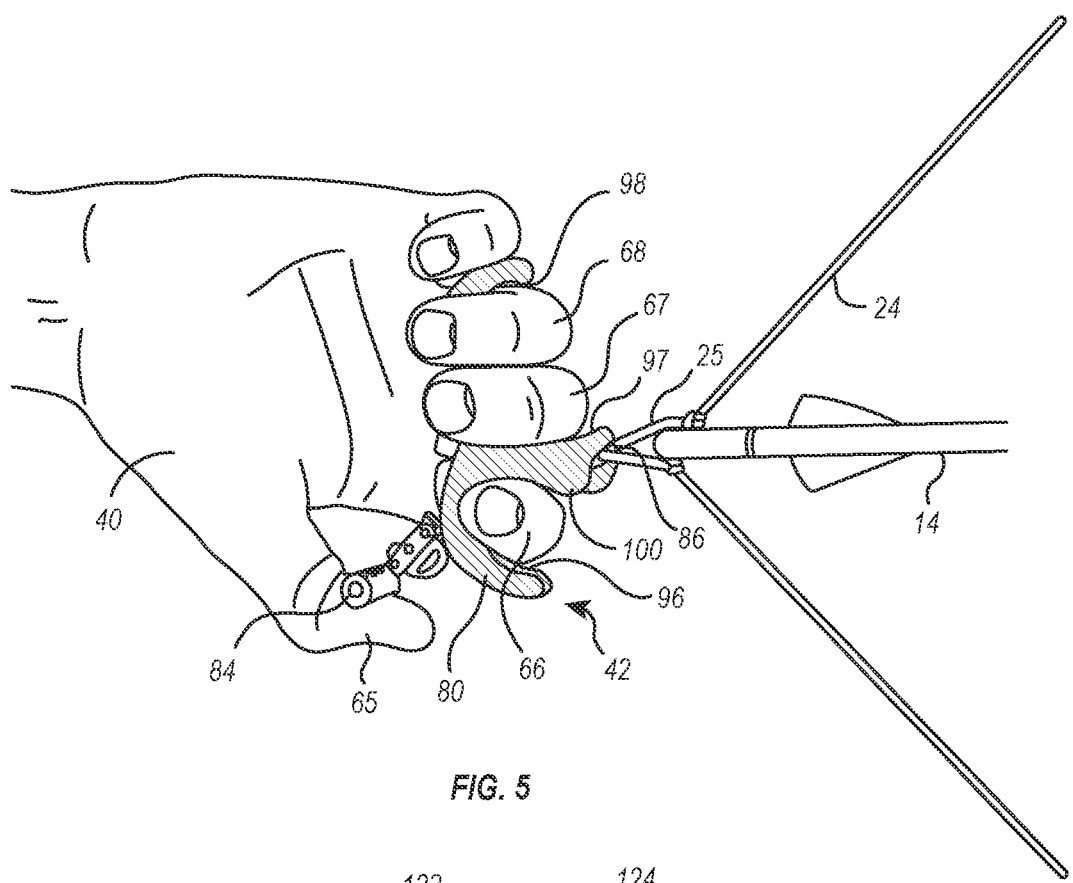
FIG. 5 is an enlarged side view of the release aid being used in FIG. 1.
FIG. 6 is a perspective view of a back side of a release hand glove assembly shown in FIG. 2.

As discussed above, release hand 40 can use release aid 42 for retracting and releasing bow string 24. Release aid 42 can come in a variety of different types, sizes, shapes and configurations. Some of the most common release aids are the wrist strap/trigger, handheld thumb release and handheld back tension/hinge. Depicted in FIG. 4 is one embodiment of a release aid 42 which includes a body 80, a catch 82 disposed on body 80, and a trigger 84 disposed on body 82. Catch 82 includes a finger 86 that is typically curved or hooked and is pivotably mounted to body 82 so as to be movable between a released position, as depicted in FIG. 4, where finger 86 is pivoted outward and a closed position, as depicted in FIG. 5, where finger 86 is pivoted inward. When finger 86 is moved to the closed position, finger 86 can be locked in place by depressing a switch 87. Trigger 84 is movably mounted on body 80 so that when trigger 84 is depressed, finger 86 is unlocked allowing finger 86 to freely move to the released position.

Body 80 includes an elongated handle 88 having a front face 90 and an opposing back face 92 that extends between opposing side faces 94 and 95. A first groove 96 is formed on a first end of front face 90 and is configured to receive index finger 66 as shown in FIG. 5. A second groove 97 and a third groove 98 are consecutively formed on front face 90 toward an opposing second end of front face 90 and are configured to receive middle finger 67 and ring finger 68, respectively. A projection 100 extends from front face 90 between first groove 96 and second groove 97 with trigger 84 being disposed on or toward the end of projection 100. Trigger 84 projects from back face 92 opposite from first groove 96.

During use, finger 86 is manually pivoted from the open released position to the closed position so that finger 86 passes around bow string 24 at a d-loop 25 and captures bow sting 24 between finger 86 and body 80, as shown in FIG. 5. Finger 86 is then locked in place. Body 80 is grasped by fingers 66-68 curving around and being received within recesses 96-98, respectively. In this configuration, thumb 65 is disposed against trigger 84. Bow string 24 can now be pulled back by using release hand 40 to pull on release aid 42. The firm grip of fingers 64 on release aid 42 makes it easier to pull back and securely hold bow string 24 in the cocked position.

To facilitate stabilization of release hand 40 and improve aiming of bow 12 when using the depicted release aid 42, the retracted release hand 40 is orientated so portions of back side 74 of release hand 40 rest against anchor points on the face or cheek of the archer, as shown in FIG. 1. When it is desired to shoot arrow 14, thumb 65 depresses trigger 84, thereby unlocking finger 86 of catch 82. The tension on bow string 24 causes finger 86 to move to the released position, thereby releasing bow string 24 and allowing it to propel arrow 14.

Depicted in FIGS. 1 and 2 is one embodiment of an archery sensory feedback system 50 incorporating features of the present invention and which can be used in association with the above discussed archery components. Archery sensory feedback system 50 comprises a release hand glove assembly 52 and/or a bow hand glove assembly 54 that each operate in combination with a mobile computer 56.

Figure 7:
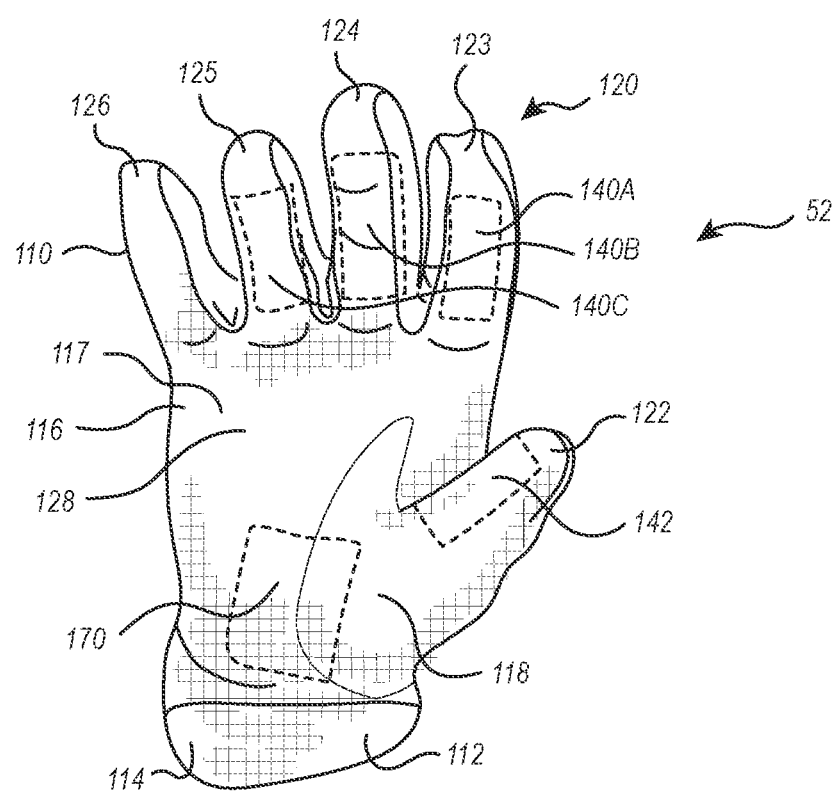
FIG. 7 is a perspective view of a front side of the release hand glove assembly shown in FIG. 6.

Depicted in FIGS. 6 and 7 is one embodiment of release hand glove assembly 52. Release hand glove assembly 52 comprises a glove 110 and at least one sensor disposed thereon where the sensor comprises a load sensor(s) and/or a motion sensor(s). Glove 110 can be either a right hand glove, left land glove, or universal glove, i.e., designed to fit either hand. As discussed below in greater detail, glove 110 can have a variety of different configurations which can cover a variety of different portions of release hand 40. Glove 110 can be made from leather, artificial leather, fabric, synthetic/plastic materials such as nylon or soft PVC, elastomeric materials such as rubber or latex, other materials or composites of the foregoing. Glove 110 can be single layered or multi-layered.

In the embodiment depicted, glove 110 has an interior surface 112 which bounds a cavity 114 in which release hand 40 can be received and has an opposing exterior surface 116. Glove 110 also has a front side 128 with a front face 117 and an opposing back side 130 with a back face 119. Front face 117 and back face 119 each form a portion of exterior surface 116. Front side 128 and front face 117 each overlay inside face 70 of release hand 40 while back side 130 and back face 119 overlay back side 74 of release hand 40. Described in other terms, glove 110 includes a pad cover 118 that extends over pad 62 of release hand 40 and includes portions of front face 117 and back face 119 and a plurality of finger sleeves 120 that project from pad cover 118. Finger sleeves 120 include a thumb sleeve 122, an index finger sleeve 123, a middle finger sleeve 124, a ring finger sleeve 125, and a pinky finger sleeve 126 which each include a portion of front face 117 and back face 119.

Continuing with FIG. 7, load sensors 140A-C are disposed on front side 128 of finger sleeves 123, 124, and 125, respectively. Load sensors 140A-C can be disposed on interior surface 112 or exterior surface 116 of the respective finger sleeves or where the fingers sleeves are multilayered load sensors 140A-C can be sandwiched between layers of the finger sleeves. Load sensors 140A-C are positioned so that when glove 110 is worn on release hand 40, load sensors 140A-C overlay index finger 66, middle finger 67 and ring finger 68 of release hand 40, respectively. Furthermore, when glove 110 is worn on release hand 40 and used in association with release aid 42 as shown in FIGS. 4 and 5, load sensors 140A-C overlay body 80 of release aid 42 as fingers 66-68 curl around to grasp release aid 42. Accordingly, as release hand 40 wearing glove 110 uses release aid 42 to draw back bow string 24, the load produced by the tensioning of the of bow string 24, i.e., the load that is applied to release hand 40, is applied to and sensed by load sensors 140A-C.

Load sensors 140 and the other load sensors used herein can comprise any electronic sensors that can sense force or pressure. Load sensors typically act by changing a voltage across some portion of the sensor and/or a current through some portion of the sensor as the sensor is subjected to a force or pressure. Examples of load sensors that can be used herein include transducers, force sensors, pressure sensors, strain gauges, load cells, and the like.

Continuing with FIG. 7, load sensor 142 is also disposed on front side 128 of thumb sleeve 122. Load sensors 142 can be disposed on interior surface 112 or exterior surface 116 of thumb sleeve 122 or where thumb sleeve 122 is multilayered, load sensors 142 can be sandwiched between layers of thumb sleeve 122. Load sensor 142 is positioned so that when glove 110 is worn on release hand 40, load sensor 142 overlays thumb 65. Furthermore, when glove 110 is worn on release hand 40 and used in association with release aid 42, load sensor 142 overlays trigger 84. Accordingly, as trigger 84 is depressed by thumb 65, the load applied by thumb 65 to trigger 84 is applied to and sensed by load sensor 142.

Turning to FIG. 6 load sensors 144A and 144B are disposed on back side 130 of finger sleeves 123 and 124, respectively, while one or more load sensors 146 are disposed on back side 130 of pad cover 118. As with the embodiments discussed above, load sensors 144 and 146 can be disposed on interior surface 112 or exterior surface 116 of the respective sleeves or where the sleeves are multilayered, load sensors 144 and 146 can be sandwiched between layers of the sleeves. As previously discussed, when release aid 42 is used, back side 74 of release hand 40 rests against the face or cheek of the archer when bow string 24 is pulled back to the cocked position. Load sensors 144 and 146 are positioned so that when glove 110 is worn on release hand 40 and bow string 24 is in the cocked position, one or more of load sensors 144 and 146 are pressed against the anchor points on the face or cheek of the archer. Accordingly, the load applied between release hand 40 and the face or cheek of the archer is applied to and sensed by one or more of load sensors 144 and 146.

It is appreciated that every archer may rest release hand 40 against the face or cheek at a slightly different orientation or position. Accordingly, all load sensors 144 and 146 may not be subjected to a load when an archer is shooting a bow. Furthermore, different ones of load sensors 144 and 146 may be subjected to loads when different archers are using release hand glove assembly 52 and different load sensors 144 and 146 may be subjected to loads between different shots by the same archer. Accordingly, by placing load sensors 144 on each of finger sleeves 123 and 124 and placing a plurality of load sensors 146 on pad cover 118, release hand glove assembly 52 can be used by multiple different archers and can accurately detect at what locations and at what force the back side of release hand 40 is pressing against the cheek or face of the archer. In some embodiments, the number of load sensors 146 can comprise at least or less than 2, 3, 4, 5, 6, 8, 10, or 20 load sensors.

Although release hand glove assembly 52 is shown using all of load sensors 140, 142, 144 and 146, in alternative embodiments release hand glove assembly 52 can be limited to using any select one of load sensors 140, 142, 144 and 146, any desired combination of load sensors and/or different placement of load sensors. For example, one embodiment of release hand glove assembly 52 may include only load sensors 140 and 144 or only load sensors 140 and 142. Furthermore, any select ones or any combinations of load sensors 140A, 140B and 140C and/or load sensors 144A and 144B can be used. For example, one embodiment of release hand glove assembly 52 may include only load sensor 140A or only the combination of load sensor 140B and 144B. Furthermore, the load sensors on glove 110 are in part specifically positioned to be used with the specific configuration of release aid depicted in FIG. 4. In other embodiments, the load sensors can be positioned to use with other configurations of release aids or positioned for use with no release aids. To that end, it is appreciated that one or more load sensors could be positioned on front face 117 and/or back face 119 of each finger sleeve 122-126 or at only one of the foregoing positions or at any combination of the foregoing positions. Furthermore, any desired number of load sensors could be positioned on front face 117 and/or back face 119 of pad cover 118.

Figure 8:
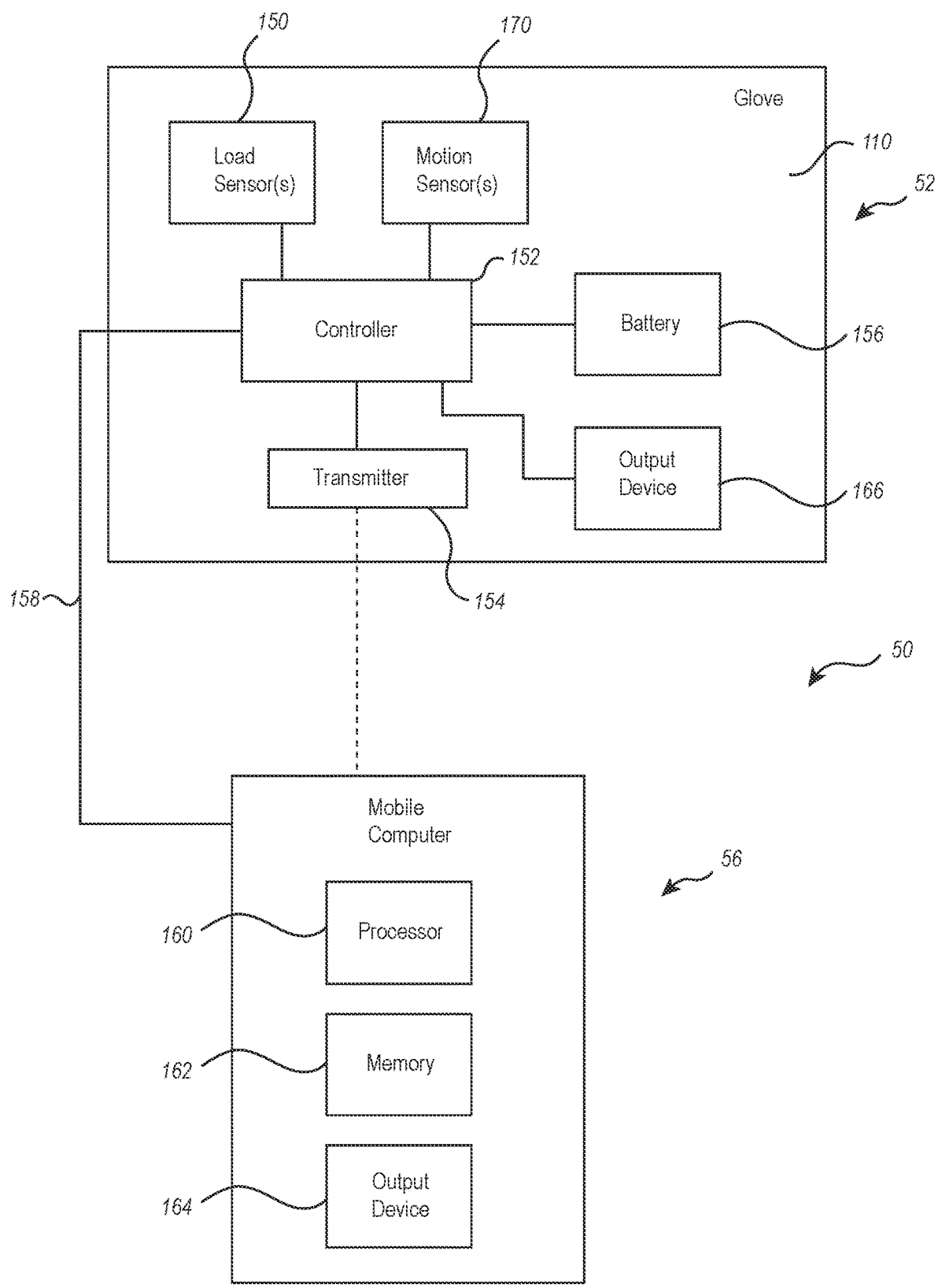
FIG. 8 is a schematic representation of the release hand glove assembly and mobile computer shown in FIG. 2.

Depicted in FIG. 8 is a schematic representation of one embodiment of archery sensory feedback system 50. In the following discussion, archery sensory feedback system 50 will be discussed as comprising release hand glove assembly 52 and mobile computer 56. Release hand glove assembly 52 is shown as comprising glove 110, as discussed above, and one or more load sensors 150. The one or more load sensors 150 can comprise any one of or any combination of load sensors 140A-C, 142, 144A and B, and 146 or load sensors at other positions on glove 110 as discussed above.

Release hand glove assembly 52 also includes other electrical components that can be used to transmit signals or values to mobile computer 56 that are based on signal generated from load sensor(s) 150. By way of example and not by limitation, such electrical components may generally include an electronic controller 152 electrically coupled with load sensor(s) 150 and a wireless transmitter 154 in electrical communication with controller 152. In general, controller 152 receives signals from load sensor(s) 150 reflective of the load applied thereto, converts the signals to digital values and then forwards the values to transmitter 154. In turn, transmitter 154 wirelessly transmits the values to mobile computer 56.

Controller 152 can comprise an analog to digital converter, a micro controller, a computer processor or other electronics that will accomplish the objective. It is also appreciated that controller 152 may comprise non transitory memory, programming code to perform the needed function and/or other electronic components as known to those skilled in the art. Wireless transmitter 154 can comprise a transmitter or transceiver and the wireless communication can be through any wireless technology such as Wi-Fi, cellular data service, Bluetooth, radio frequency (RF), optical communication including infrared and laser, mobile satellite communication, and the like. In an alternative embodiment, in contrast to using a wireless connection, a fixed or removable hard wire connection 158 can be formed between controller 152 and mobile computer 56.

Controller 152 and transmitter 154 along with other desired electrical components can be secured to glove 110 at any location that does not interfere with load sensor(s) 150 or the use of bow 12 to shoot arrow 14. A battery 156 can also be disposed on glove 110 to power the electrical components thereon. It is appreciated that other electrical circuitry known to those skilled in the art could be used to process and transmit signals from load sensor(s) to mobile computer 56 and that such circuitry is within the scope of the present invention.

Mobile computer 56 can comprise a conventional laptop computer, cellular smartphone, tablet computer, handheld computer, or other specially designed computer. Mobile computer 56 includes, in part, a computer processor 160, non-transitory memory 162, and an output device 164. Other conventional components are also included. Memory 162 includes computer executable code stored thereon that when executed by computer processor 160 can in part compare a value generated from the signal produced by load sensor(s) 150 to a predetermined value and then transmit a notice signal to output device 164 based on the results of the comparison. In turn, output device 164 provides a notice, as discussed below, that is useful to the archer relative to shooting bow 12. Output device 164 can comprise a display screen that displays words, values, symbols, graphics or other desired text; a light source that can turn off and on or emit a certain color or flashing; a vibrator; a sound generator or other devices that can generate a differentiating notice.

In one method of operation, archery sensory feedback system 50 can simply provide measured information to the archer to help the archer better understand under what forces he or she is shooting. For example, output device 164 could comprise a screen that simply displays force values generated from each of the different load sensors or from groups of load sensors. More specifically, load sensors 140 could be used to generate load values that reflect the force being pulled on bow string 24 or load values could be generated for each finger 66-68. Likewise, load sensor 142 could be used to generate the load applied to trigger 84 while load sensors 144 and 146 reflect the force applied to the face of the archer.

However, one approach to improving accuracy and consistency in archery is to repeatedly replicate a preferred shot or preferred conditions for a shot. As discussed in the background section herein, exacting conditions must be obtained and maintained for an archer to have a consistently accurate bow shot. Accordingly, once a preferred stance, bow string draw, hand placement and the like have been established, repeatedly replicating those preferred conditions improves accuracy and consistency in shooting. The inventive archery sensory feedback system 50 can assist the archer in confirming that there is consistency between shots or that at least select preferred conditions are satisfied or replicated. For example, when using release hand glove assembly 52 in conjunction with release aid 42, load sensors 140A-C being pulled against release aid 42 generate a signal that relates to the amount of force being applied to release hand 40. The information is transferred to mobile computer 56 as discussed above where the information is converted by computer processor 160 to a value that corresponds to the applied force. In turn, processor 160 can compare the measured force to a predetermined value that relates to a desired force. If the measured force is within a predefined range of the predetermined value, processor 160 sends a signal to output device 164 to generate a positive notice. In contrast, if the measured value falls outside the predefined range of the predetermined value, processor 160 could either send no signal to output device 164, could send a signal to generate a negative notice, or could send a notice providing information on why or how the measured values fall outside of the defined range. Accordingly, based on the notice generated, the archer knows whether he or she is drawing bow string 24 at the desired force and can make adjustments, if needed.

The other load sensors can operate in a similar manner. For example, archery sensory feedback system 50 can use information from load sensor 142 to determine whether the load applied to trigger 84 is within a range of a predetermined value and information from load sensors 144 and 146 can be used determine whether the force being applied to the face of the archer is within a range of a predetermined value. Information on the reported comparison enables an archer to either make adjustments or have confirmation to continue on shooting in the same way. Where a plurality of load sensors are being loaded, it is appreciated that the comparison between the measured value and the predetermined value can be based on an average of the measured values, a high of the measured values, a low of the measured values or by separately comparing each of the measured values to a predetermined value. Where a number of measured values are being compared to a number of predetermined values, it is appreciated that a variety of different notice signals may be sent to output device 164 and the user may have to scroll between a variety of different comparison results.

Where output device 164 is located on mobile computer 56, release hand glove assembly 52 can be formed using transmitter 154 with no output device being located on glove 110. However, in an alternative embodiment as also depicted in FIG. 8, transmitter 154 can comprise a transceiver and an output device 166 can be disposed on glove 110 and communicating with controller 152. Output device 166 can comprise the same alternatives as previously discussed above with regard to output device 164. In this embodiment, processor 160 sends a notice signal to output device 166 so that the notice signal is generated directly from release hand glove assembly 52 for easy detection by the archer.

In addition to monitoring the above applied loads to release hand 40, it is also desirable to monitor movement of release hand 40 during drawing of bow string 24, when bow string 24 is fully cocked, and/or just after release of bow string 24 from the cocked position. For example, it is helpful to ensure that release hand 40 is stable during the shot and that there is no jerking or other undesired movement as trigger 84 is depressed or bow string 24 is otherwise released. To help accomplish the foregoing, the sensors located on archery sensory feedback system 50 can also comprise one or more motion sensors 170 as depicted in FIG. 8. Examples of motion sensors that can be used include accelerometers which can be used to measure acceleration for X, Y, and Z movement and gyroscope sensors which can measure the extent and rate of rotation in space (roll, pitch and yaw). Other motion sensors can also be used. For example, high speed cameras could be mounted on glove 110. Images from consecutive frames taken by the cameras could be compared by processor 160 to determine movement of glove 110. Stereoscopic cameras can also be used to determine three-dimensional movement of glove 110.

Archery sensory feedback system 50 can be designed with one, two or three accelerometers, each positioned to measure acceleration in a different direction, or with a gyroscope sensor, or with a combination of a gyroscope sensor and any desired number of accelerometers. As depicted in FIGS. 6 and 7, motion sensors 170 are shown disposed on front face 117 of pad cover 118 and back face 119 of pad cover 118. However, because their location is typically not critical, they can also be positioned at other locations. Motion sensors 170 can be attached on interior surface 112, exterior surface 116, or between layers of pad cover 118.

During use, motion sensors 170 can continually track movement of release hand 40, such as acceleration, direction of movement, rate of rotation, and/or angle of rotation. As previously mentioned, it can be helpful to track movement of release hand 40 during release of bow string 24 and for a time period prior to and after release of bow string 24. For example, computer processor 160 can be programmed so that motion sensors 170 are activated when the load on load sensors 140 exceeds a predetermined amount that is sufficiently high to designate that bow string 24 is being retracted for a shot. In turn, motion sensors 170 can be deactivated when the load on load sensors 140 drops below the predetermined amount which signals that bow string 24 has been released for shooting the arrow.

Processed values which are based on signals produced by motions sensors 170 are stored in memory 162. If desired, all of the processed values representing movement of release hand 40 between activation and deactivation of motions sensors 170 can be recorded for use. In another embodiment, once the processed values have been recorded between activation and deactivation of motions sensors 170, computer processor 160 can detect the point of maximum load on load sensors 140, which is the point when bow string 24 is fully drawn back. Computer processor 160 could then identify or otherwise separate out the processed values that extend between a predetermined time period prior to and after the time of maximum load. This subset of stored values could then be used for subsequent processing.

In any event, once the desired range of processed values is determined, these values can be used to assist the archer. For example, in one embodiment, the processed values could simply be displayed or printed, such as in a graph or table, by output device 164 so that the archer could see the extent of movement. In an alternative embodiment, the processed values could be compared to predetermined values to determine if the processed values are within an acceptable range of the predetermined values. For example, three accelerometers could be incorporated into release hand glove assembly 50 that measure acceleration in the X, Y, and Z axis during the defined time period. The average values, maximum value, or minimum values for each accelerometer could be compared to predetermined values. In another embodiment, the average values, maximum value, or minimum values for all accelerometers could be summed or averaged and then compared with a single predetermined value. Similar types of comparisons could also be done with or combined with values generated from the gyroscopic sensor.

It is appreciated that there are almost innumerable numbers of different ways in which values generated from motion sensors could be compared to predetermined values. The exact values that are compared is not critical. What is helpful, however, is when the compared values accurately reflect whether release hand 40 is moving excessively relative to the predetermined value.

As discussed above, in one embodiment of the present invention measured values from the load sensors and/or the motion sensors are compared to predetermined values to determine if shots are being made under desired conditions. The "predetermined values" can be predetermined numerical values that were previously installed in memory 162, can be based on past experience and loaded into memory 162, can be obtained from a separate source, such as a table, chart, data base, website, or other index or resource and loaded into memory 162, or they can be automatically generated and loaded into memory 162 based on calibration shots made by the archer.

Figure 9:
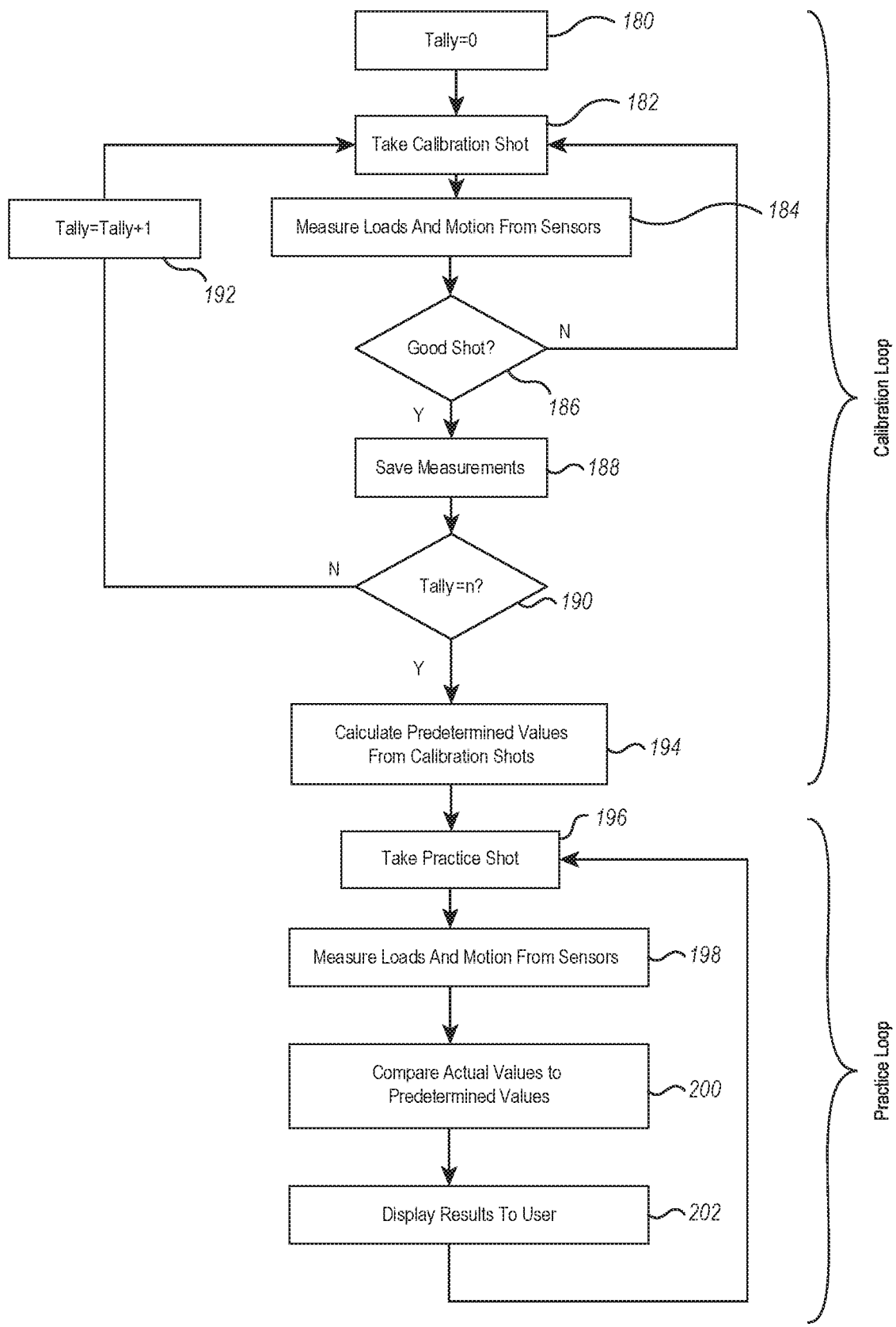
FIG. 9 is a block flow diagram showing one method of using the inventive archery sensory feedback system.

For example, depicted in FIG. 9 is a block flow diagram showing one example of how archery sensory feedback system 50 can be used to establish predetermined values based on preferred calibration shots made by an archer. The flow diagram then shows how the predetermined values can be compared to actual values measured during practice shots to determine if the actual values are within a desired range of the predetermined values.

Initially, a tally number "n" is selected which corresponds to the number of calibration shots that will be averaged to determine the predetermined values. The tally number is stored in memory 162 and is used in below discussed step 190. The tally number "n" could be 1, 2, 3, 4, 5, or any other desired number or at least any of the prior numbers. At the first step 180 the actual tally number n is set to zero. In step 182, the archer takes a calibration shot using archery sensory feedback system 50 as discussed above. Actual values of applied load and movement generated from load sensors 150 and motions sensors 170 are stored in memory 162. In step 186 the archer makes a decision based on subjective and/or factual information as to whether the shot was good. For example, did the arrow hit the target, was the proper stance used, was the bow string fully retracted, was the release hand stable, etc. If the answer is no, the archer inputs notice in mobile computer 56 and the actual values of the applied load and movement that were stored for the shot are not used. The method then returns to step 182 where the next calibration shot is taken. It is appreciated that the input device for designating whether or not the shot was good can be part of release hand glove assembly 52 or mobile computer 56.

If in step 186 the archer determines that the shot was good, the archer so designates to mobile computer 56 and the actual values of applied loads and movements that were stored for the calibration shot are saved or otherwise designated for use in calculating the predetermined values. In step 190 the processor determines if the current saved tally number equals the preselected tally number. If no, the stored tally number is increased by 1 in step 192 and the method returns to step 182 where the next calibration shot is taken. If in step 190, the answer is yes, that means that the archer has taken the desired number of good calibration shots and the load and movement values for all of those shots have been stored in memory 162. Accordingly, in step 194 processor 190 calculates the predetermined value(s) based on the calibration shots and stores them in memory 162. As previously mentioned, the predetermined value(s) can be a single combined value or multiple separate values. Furthermore, the predetermined value(s) can be calculated in a variety of different ways. By way of example and not by limitation, below is a list of a few different predetermined values that could be calculated:

1. A separate predetermined value could be calculated for each separate load sensor and each motion sensor.
2. Predetermined values could be calculated for some individual load sensors and motion sensors and some groups of load sensors and/or motion sensors. For example, a single predetermined value may be calculated for load sensor 142 while a single predetermined value is also calculated for all of load sensors 140A-C.
3. A single predetermined value can be calculated which is the combination of all load sensors.
4. A single predetermined value can be calculated which is the combination of all motion sensors.

Furthermore, although release hand glove assembly 52 may contain a variety of different load sensors and motion sensors, archery sensor feedback system 50 could be set to only monitor select load sensors and/or motion sensors and ignore the others. As such, the predetermined values would only be based upon those sensors that are being monitored. Other predetermined values could also be calculated.

Once it is determined what sensors the predetermined value(s) will be based on, the predetermined value(s) will typically be an average of the recorded values for the sensors over each of the calibration shots. However, the predetermined value(s) could also be calculated in other ways such as the predetermined value being the maximum or minimum recorded value of the calibration shots. Other methods of calculation could also be used.

Returning to FIG. 9, once the predetermined values are calculated and stored in memory in step 194, an archer takes a regular practice shot in step 196 again using the same archery sensory feedback system 50. In step 198, measurements are taken by the load and motion sensors during the practice shot and those measurements are converted to values that correlate with the predetermined values. In step 200, the calculated values based on the practice shot are compared to the predetermined values. In step 202 a signal is sent to the output device to designate whether or not the comparison was favorable. Set forth below are a few examples of how the predetermined value and actual value could be compared:

1. Determine whether the actual value is identical to the compared value.
2. Determine whether the actual value is within in a predefined range of +/− predetermined value;
3. Determine whether the actual value exceeds the predetermined value; or
4. Determine whether the actual value is lower than the predetermined value.

Other ways of comparison could also be made. It is also appreciated that the results of the comparison can be reported or otherwise displayed in a variety of different ways. Set forth below are a few examples of how the results could be displayed:

1. The output device may simply show a signal such as a tone, light, vibration, or display if the comparison was positive and either no signal or a different signal of the comparison was negative.
2. The output device could show a difference between the actual value and the predetermined value, such as on a display screen.
3. The output device could show a comparison between actual value and the predetermined value, such as on a display screen.
4. With regard to sensed motion, the output device may show a depiction or animation of the direction or angle of movement.

Other displays could also be used. Once the results are displayed, the method returns to step 196 where the next practice shot is taken and the process is continued. It is appreciated that the steps outlined in FIG. 9 are only one example and that different or modified steps could also be used.

Figure 10:
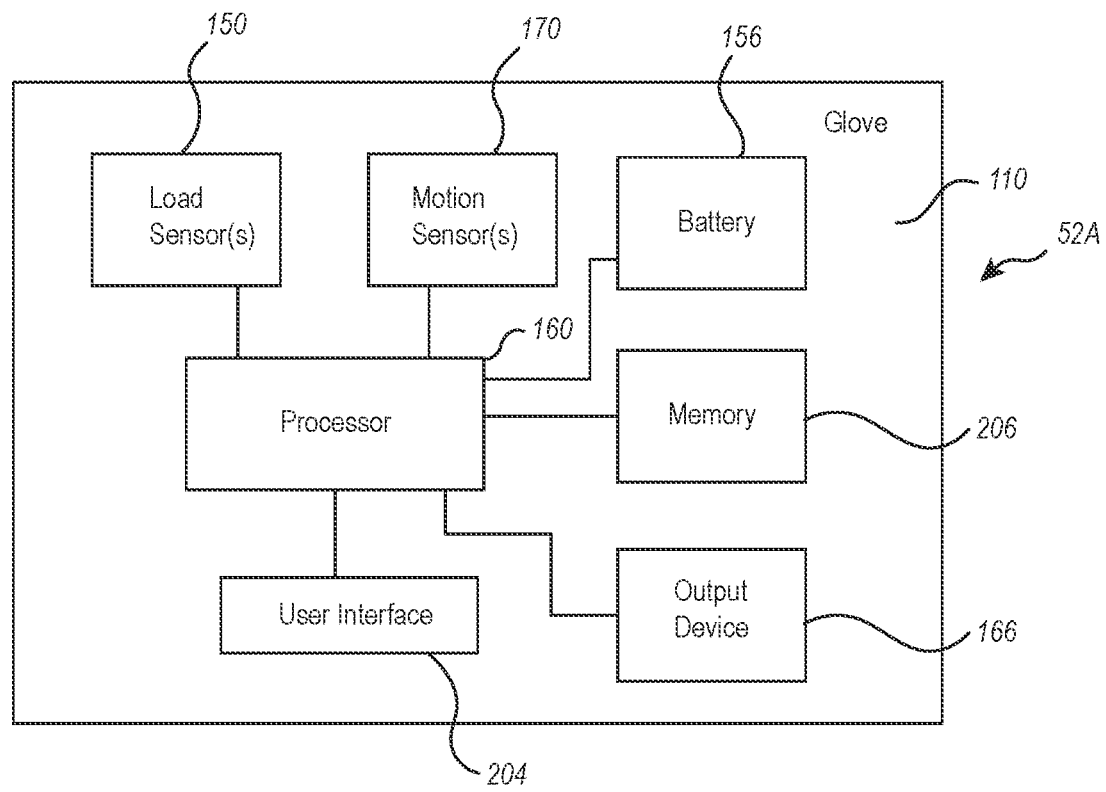
FIG. 10 is a schematic representation of an alternative embodiment of the release hand glove assembly shown in FIG. 8 that does not use a mobile computer.

In the embodiment discussed above, archery sensory feedback system 50 comprises release hand glove assembly 52 used in association with mobile computer 56. In an alternative embodiment, however, the processing elements of mobile computer 56 could be implemented directly into release hand glove assembly 52 and thereby eliminate the need for mobile computer 56. For example, depicted in FIG. 10 is an archery sensory feedback system 50A that includes a release hand glove assembly 52A. Release hand glove assembly 52A includes glove 110, load sensor(s) 150 and/or motion sensor(s) 170 and further includes computer processor 160, battery 156, and output device 166. Release hand glove assembly 52A also includes a user interface 204 for inputting information to processor 160 and memory 206 for storing the computer executable code and relevant data. In this design, release hand glove assembly 52A is configured to perform all of the necessary functions of a mobile computer.

Figure 11:
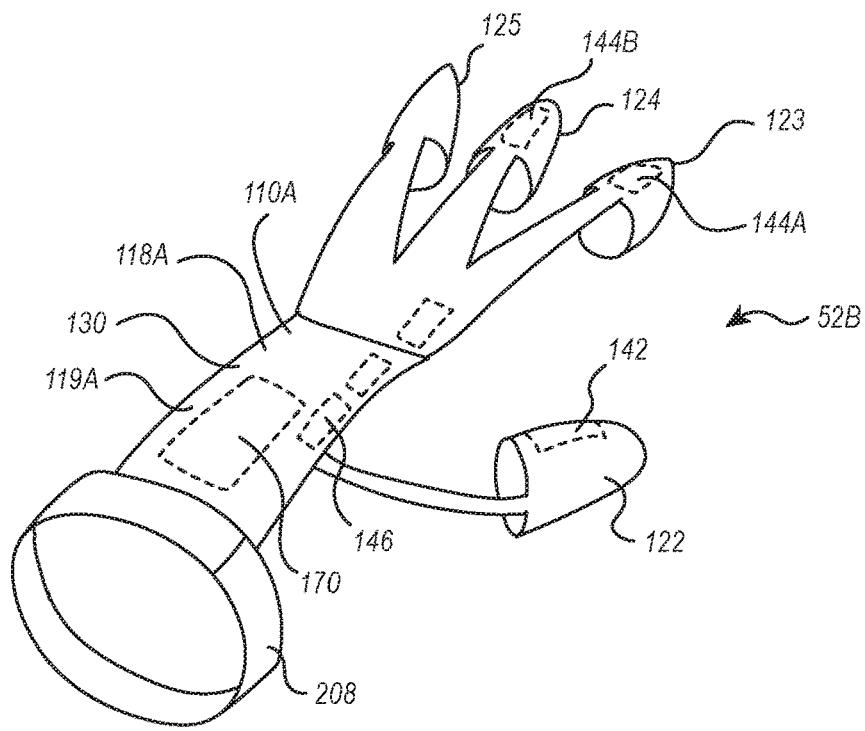
FIG. 11 is a perspective view of an alternative embodiment of the release hand-glove assembly shown in FIGS. 6 and 7.

In other embodiments, it is appreciated that glove 110 of release hand glove assembly 52 can have a variety of different configurations depending, in part, on the type and number of sensors used on the glove. For example, depicted in FIG. 11 is another alternative embodiment of a release hand glove assembly 52B comprising a glove 110A. In general, glove 110A comprises glove 110 wherein unneeded parts have been removed. More specifically, glove 110A comprises thumb sleeve 122, index finger sleeve 123, middle finger sleeve 124 and ring finger sleeve 125 which are all connected together by a pad cover 118A having a back face 119A. Pad cover 118A simply comprises a portion of back side 130 of pad cover 118 (FIG. 6). Glove 110A further comprises a wrist strap 208 with pad cover 118A, which can also be considered a tie, extending between the finger sleeves and wrist strap. When worn, pad cover 118A extends over a portion of back side 74 of release hand 40. Load sensors 140, 142, 144, and 146 can be positioned on glove 110A in the same way and at the same location they were placed on glove 110. Motion sensors 170 can be positioned on pad cover 118A. It is appreciated that a variety of other glove configurations can also be used by removing select portions of glove 110. For example, if thumb sensor 142 was not used then thumb sleeve 122 could be removed and if load sensor 140A was not used, ring finger sleeve 125 could be removed.

Figure 12:
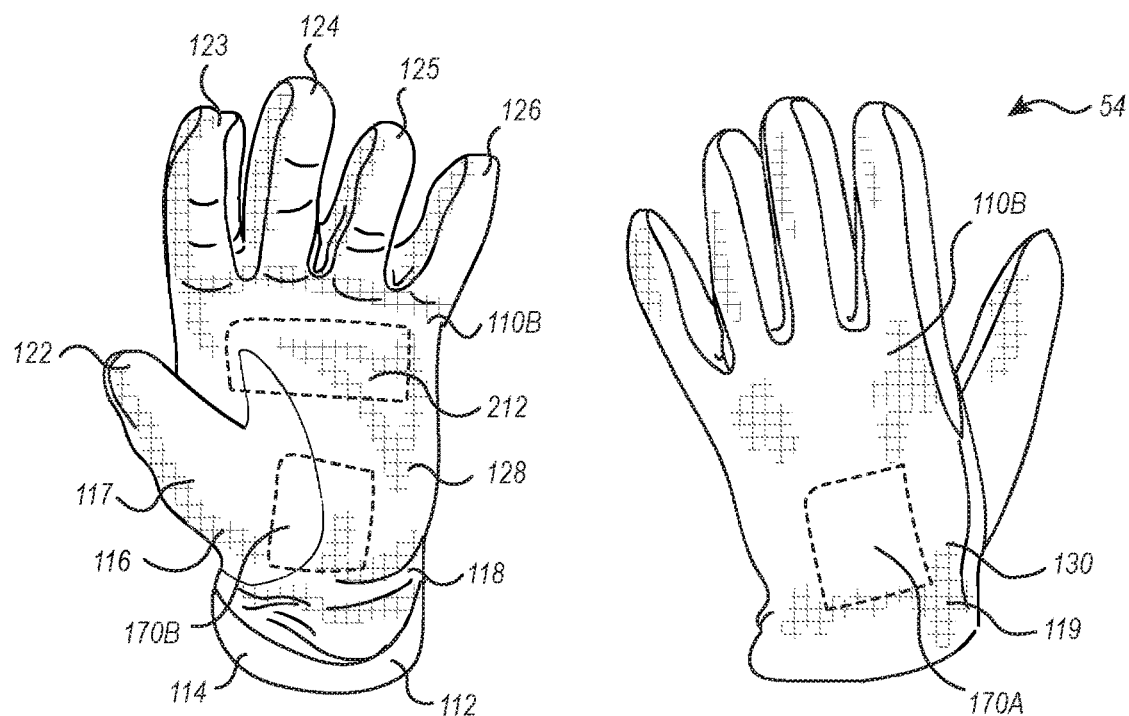
FIG. 12 is a front and back view of the bow hand glove assembly shown in FIG. 2.

As previously discussed with regard to FIG. 2, archery sensory feedback system 50 can also comprise bow hand glove assembly 54 that is used in conjunction with or in place of release hand glove assembly 52. Depicted in FIG. 12 is one embodiment of bow hand glove assembly 54 which comprises a glove 110B. Glove 110B can be identical to glove 110 as previously discussed with regard to release hand glove assembly 52 except that it is the opposite hand glove. For example, glove 110 of release hand glove assembly 52 can be a left hand or right hand glove while glove 110B on bow hand glove 54 will be the opposite hand glove relative to glove 110. Accordingly, like elements between gloves 110 and 110B are identified by like reference characters and all prior discussions of glove 110 including but not limited to composition, configuration, modifications, and alternative embodiments are incorporated into and are applicable to glove 110B.

Bow hand glove assembly 54 can also have one or more load sensors and/or one or more motion sensors mounted thereon. For example, bow hand glove assembly 54 is depicted as comprising a load sensor 212 that is positioned on front side 128 of pad cover 118 so that load sensor overlays palm 72 of bow hand 38 when worn. Load sensor 212 can also be positioned on interior surface 112, exterior surface 116 or between layers of glove 110B. Load sensor 212 can also be the same alternative types of load sensors as previously discussed with regard to release hand glove assembly 52. Other load sensors could also be positioned on glove 110B at other locations. For example, bow hand glove assembly 54 could be provided with at least, less than or equal to 1, 2, 3, 4, 5, 6, or load sensors.

Load sensor 212 is positioned so that it can be used to determine the load applied to bow hand 38 during the shooting of arrow 14. For example, as depicted in FIG. 1, bow hand 38 grasps grip 22 of bow 12 during the shooting of bow 12. Load sensor 212 is positioned so that as bow string 24 is retracted, the horizontal load created on bow 12 by retracting bow string 24, i.e., the load applied to bow hand 38, is applied to load sensor 212 so that a value of the load can be determined.

Bow hand glove assembly 54 is also shown as having a motion sensor 170A disposed on back side 130 of pad cover 118 and motion sensor 170B disposed on front side 128 of pad cover 118. Again, the motion sensors 170 can comprise accelerometers, gyroscope sensors or other types of motion sensors as previously discussed with release hand glove assembly 52. Motion sensors 170 can be used to determine movement properties of bow hand 38, such as direction of movement, distance of movement, acceleration of movement, and angular rotation of bow hand 38 and any combination of the foregoing. These measurements can be monitored during retraction of bow string 24, during release of bow string 24 and following release of bow string 24. Motion sensors can be positioned at any desired location on gloves 110B and can be located on interior surface 112, exterior surface 116 or between layers of glove 110B. The number of motion sensors on glove 110B could be at least, less than or equal to 1, 2, 3, 4, 5, 6, or more motion sensors.

Again, monitoring loads applied to bow hand 38 and movement of bow hand 38 during the shooting of bow 12 and then analyzing those results or comparing them to predetermined values can assist an archer in improving accuracy and consistency in shooting bow 12.

Figure 13:
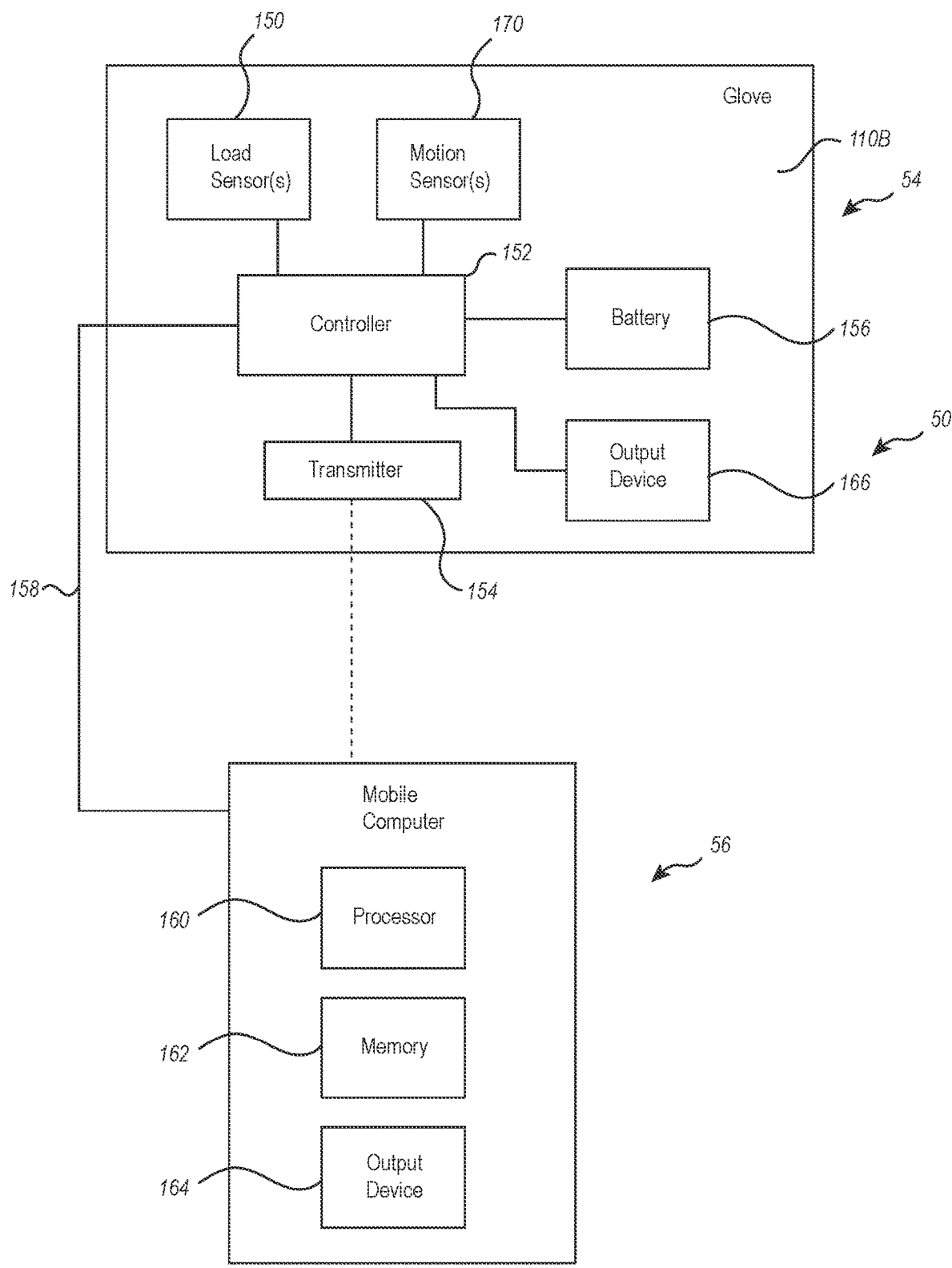
FIG. 13 is a schematic representation of the bow hand glove assembly shown in FIG. 12 used in association with the mobile computer.

FIG. 13 is a schematic representation of archery sensory feedback system 50 where system 50 comprises bow hand glove assembly 54 used in combination with mobile computer 56. Bow hand glove assembly 54 can have the same electrical components, same modifications and be used in the same way as release hand glove assembly 52 previously discussed. As such like elements between release hand glove assembly 52 and bow hand glove assembly 54 are identified by like reference characters and the prior discussion of configuration, modifications, alternative embodiments and operation of release hand glove assembly 52 are incorporated into and are applicable to bow hand glove assembly 54.

For example, bow hand glove assembly 54 can comprise glove 110B where load sensor(s) 150 can comprise load sensors 212 and/or other load sensors disposed on glove 110B. Motion sensor(s) 170 can comprise motion sensors 170A, 170B, combinations thereof or other motion sensors disposed on glove 110B. Bow hand glove assembly 54 can also comprise controller 152 for processing signals from sensors 150 and 170 and a battery 156 for energizing the electrical components on glove 110B. A hard wire connection 158 can connect controller 152 or mobile computer 56. Alternatively, transmitter 154 can facilitate wireless communication between controller 152 and mobile computer 56. Where desired, output device 166 can be disposed on glove 110B.

Bow hand glove assembly 54 operates with mobile computer 56 the same way release hand glove assembly 52 operates with mobile computer 56. As such, the prior discussion of the operation between release hand glove assembly 52 and mobile computer 56 is applicable to and is incorporated herein as discussion on operation between bow hand glove assembly 54 and mobile computer 56. Furthermore, the block flow diagram depicted in FIG. 9 is also applicable to the use of bow hand glove assembly 54 except that now the measured loads and motions in steps 184 and 198 are based on measurements from sensors on bow hand glove assembly 54. As such, the prior discussion of the method of use of release hand glove assembly 52 made in association with FIG. 9 is applicable to and is incorporated herein as discussion of the method of use of bow hand glove assembly 54.

Figure 14:
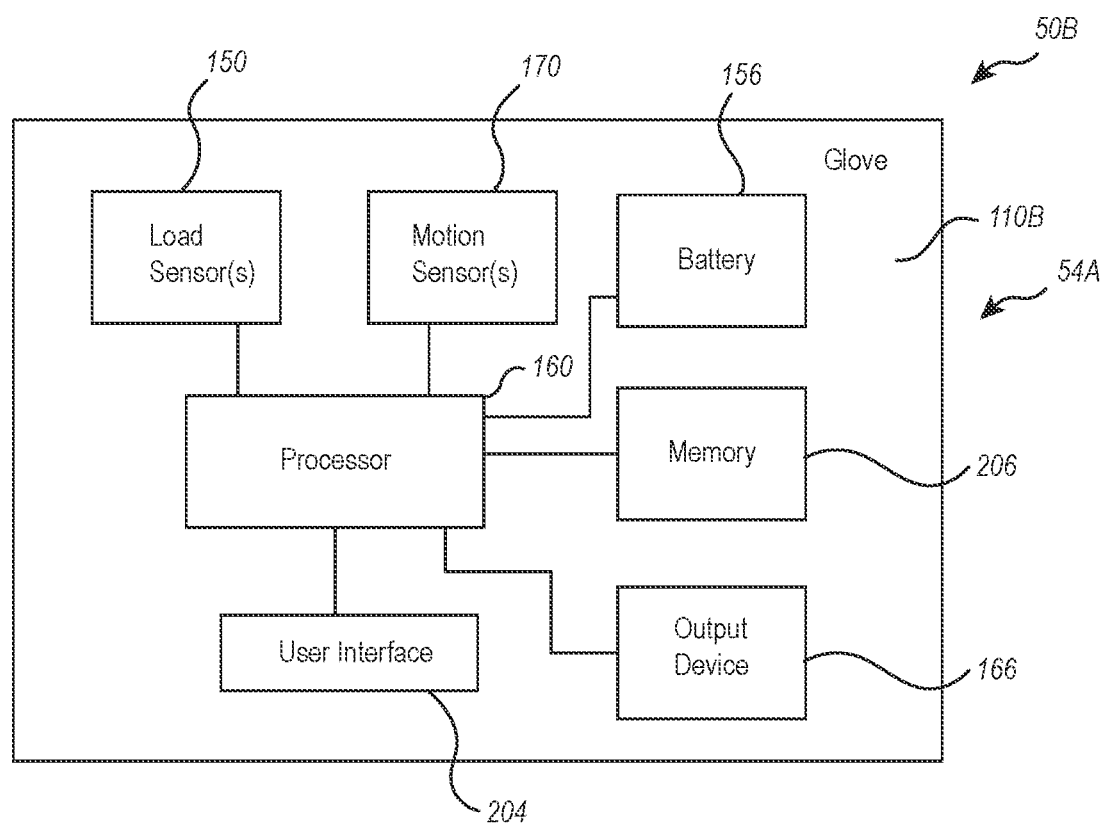
FIG. 14 is a schematic representation of an alternative embodiment of the bow hand glove assembly shown in FIG. 13 where the mobile computer is not required.

In the embodiment discussed above, archery sensory feedback system 50 comprises bow hand glove assembly 54 used in association with mobile computer 56. In an alternative embodiment, however, the processing elements of mobile computer 56 could be implemented directly onto bow hand glove assembly 54 and thereby eliminate the need for mobile computer 56. For example, depicted in FIG. 14 is an archery sensory feedback system 50B that comprises a bow hand glove assembly 54A. Bow hand glove assembly 54A includes glove 110B, load sensor(s) 150 and/or motion sensor(s) 170 and further includes computer processor 160, battery 156, and output device 166. Bow hand glove assembly 54A also includes user interface 204 for inputting information to processor 160 and memory 206 for storing the computer executable code and relevant data. In this design, bow hand glove assembly 54A is configured to perform all of the necessary functions of mobile computer 56 and thus mobile computer 56 can be eliminated.

Figure 15:
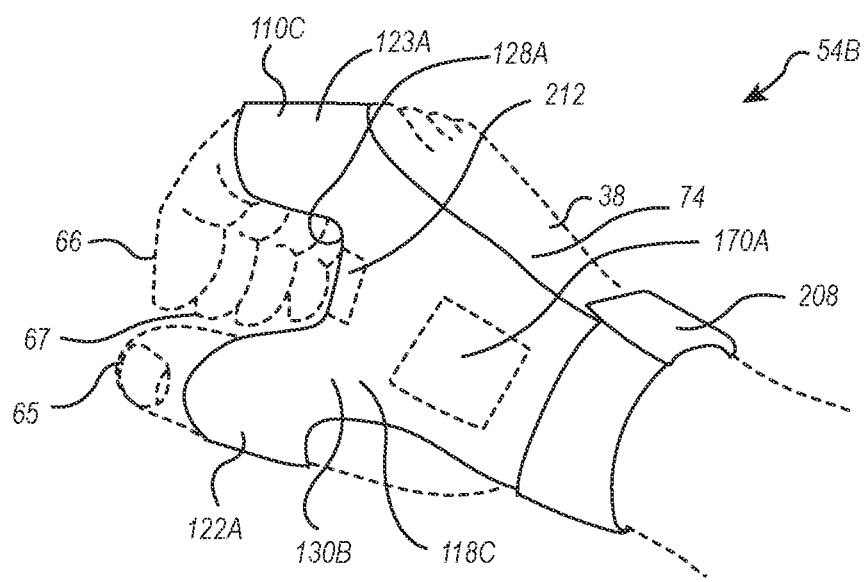
FIG. 15 is a perspective view of an alternative embodiment of the bow hand glove assembly shown in FIG. 12.

In other embodiments, it is appreciated that glove 110B of bow hand glove assembly 54 can have a variety of different configurations depending, in part, on the type and number of sensors used on glove 110B. For example, depicted in FIG. 15 is another alternative embodiment of a bow hand glove assembly 54B comprising a glove 110C. In general, glove 110C comprises glove 110B wherein unneeded parts have been removed. More specifically, glove 110C comprises a thumb sleeve 122A covering a portion of thumb 65 and an index finger sleeve 123A covering a portion of index finger 66. Sleeves 122A and 123A are connected together by a pad cover 118C that includes a front side 128A that extends over a portion of palm 72 (FIG. 3) of bow hand 38 and a back side 130B that extends over a portion of back side 74 of bow hand 38. Glove 110C further comprises a wrist strap 208. Pad cover 118A, which can also be considered a tie, extends between fingers sleeves 122A/123A and wrist strap 208.

Load sensor 212 is positioned on front side 128 of glove 110C so as to overlay at least a portion of palm 72 of bow hand 38. Load sensor 212 and any other load sensors used can be disposed on glove 110C the same way and location they are placed on glove 110B. One or more motion sensor 170A can be positioned on back side 130B of pad cover 118A or at other locations. It is appreciated that a variety of other glove configurations can also be used by removing or adding select portions of glove 110. For example, other finger sleeves could be added to glove 110C. It is noted that glove 110C can also be referred to as a fingerless glove in that all of the ends of the fingers remain uncovered. Furthermore, it is noted that the bow hand glove assembly can be formed with no load sensors disposed on any finger sleeves thereof and can be formed so that when the bow hand glove assembly is worn on the bow hand 38, no load sensors overlay any of fingers 64 of bow hand 38.

In the above discussed embodiments, mobile computer 56 is shown as being used with release hand glove assembly 52 or bow hand glove assembly 54. However, in other embodiments, archery sensory feedback system 50 can comprise both release hand glove assembly 52 and bow hand glove assembly 54 being used simultaneously with mobile computer 56. In other alternative embodiments, it is appreciated that release hand glove assembly 52 and bow hand glove assembly 54 can be eliminated and the components thereof incorporated directly onto bow 12 or release aid 42.

Figure 16:
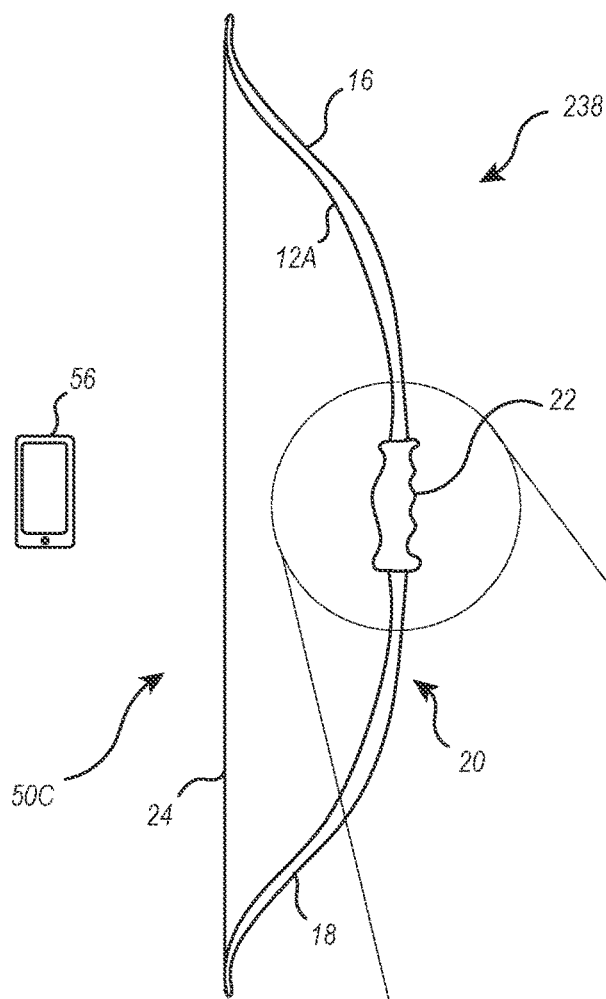
FIG. 16 is an elevated side view of an alternative embodiment of an archery sensory feedback system where sensors are directly mounted on a bow.
Figure 17:
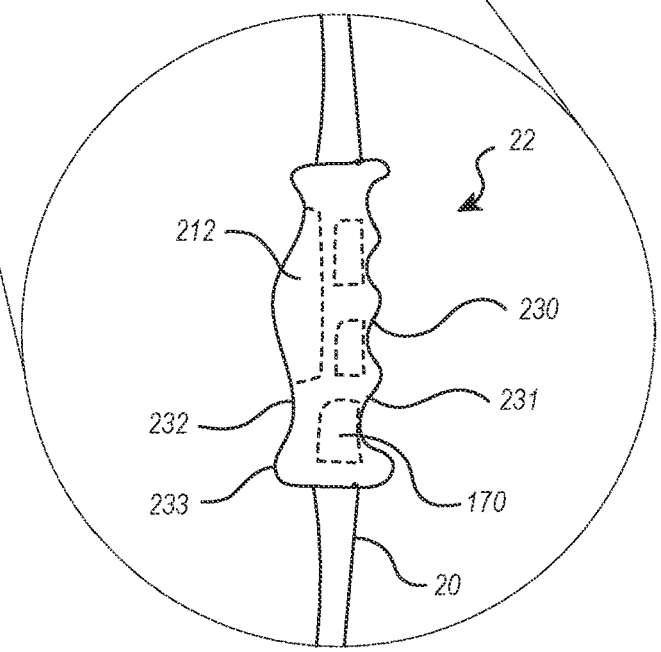
FIG. 17 is an enlarged view of the grip of the bow shown in FIG. 16.

For example, depicted in FIG. 16 is an archery sensory feedback system 50C which comprises a bow assembly 238 and mobile computer 56. Bow assembly 238 includes a bow 12A and other electrical components as discussed below Like elements between bows 12 and 12A are identified by like reference characters. Bow 12A includes riser 20 and grip 22. As depicted in FIG. 17, grip 22 includes a front side 230 with a front face 231 and an opposing back side 232 with a back face 233.

Bow assembly 238 also includes one or more load sensor(s) 212, previously discussed, disposed on back side 232. Load sensor(s) 212 is positioned so that it can be used to determine the load applied to bow hand 38 during the shooting of bow 12A. That is, bow hand 38 grasps grip 22 of bow 12A during the shooting of bow 12A. Load sensor(s) 212 is positioned so that as bow string 24 is retracted, the horizontal load created between bow hand 38 and grip 22 by retracting bow string 24 is applied to and sensed by load sensor(s) 212. Other load sensors could also be applied to grip 22 such as on front side 230.

Bow assembly 238 further includes one or more motion sensors 170, previously discussed, applied to grip 22. Just as motion sensors 170 were used on bow hand glove assembly 54 to determine movement of bow hand 38, motion sensor(s) 170 on grip 22 can be used to determine movement of bow 12A which in turn relates to movement of bow hand 38. The one or more motion sensors 170 need not be placed on grip 22 but could also be placed on riser 20 or some other location on bow 12A.

Figure 18:
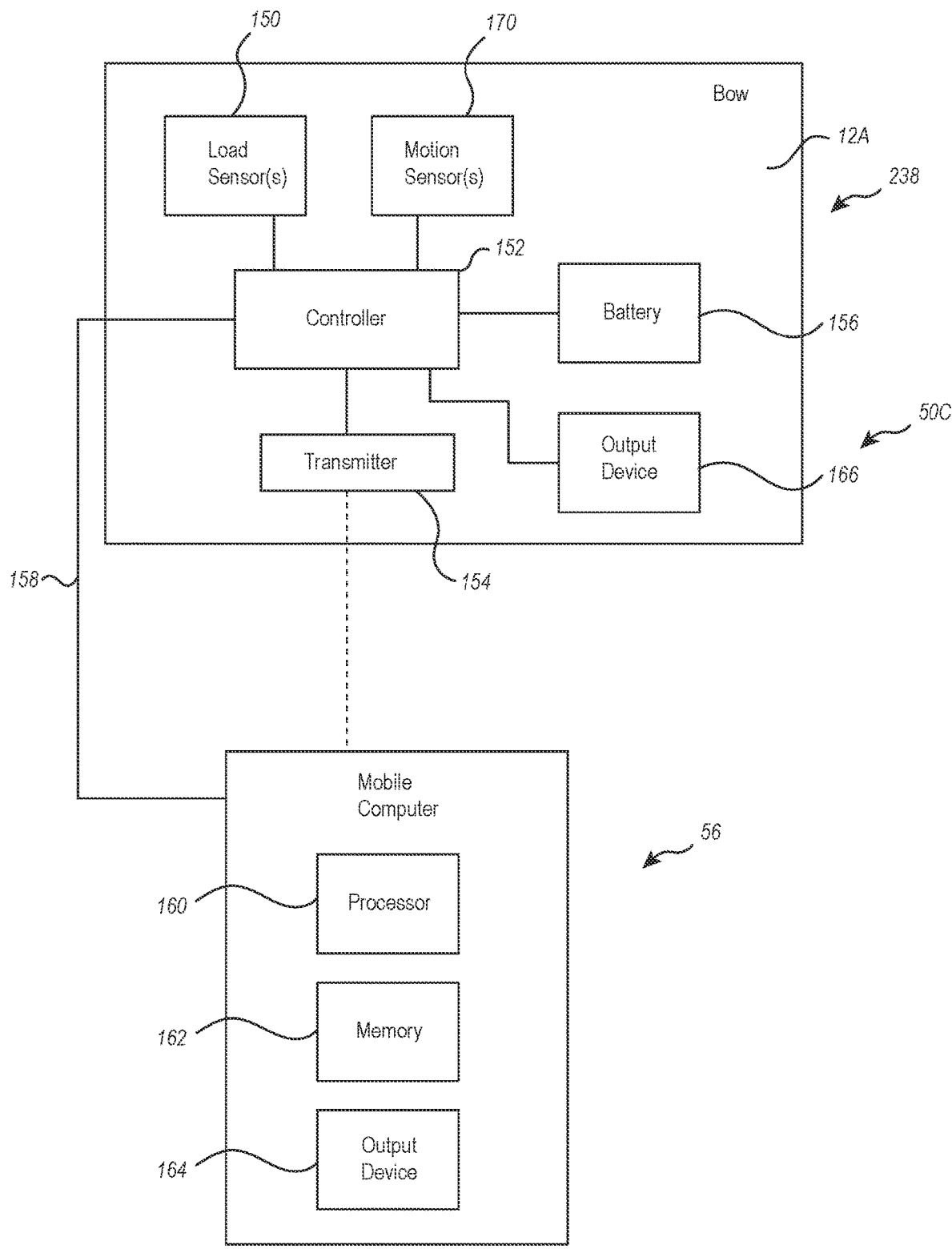
FIG. 18 is a schematic representation of the archery sensory feedback system shown in FIG. 16.

FIG. 18 is a schematic representation of archery sensory feedback system 50C where system 50C comprises bow assembly 238 used in combination with mobile computer 56. Bow assembly 238 can have the same electrical components, same modifications and be used in the same way as previously discussed with bow hand glove assembly 54. As such, like elements between bow hand glove assembly 54 and bow assembly 238 are identified by like reference characters and the prior discussion of configuration, modifications, alternative embodiments and operation of bow hand glove assembly 54 are incorporated into and are applicable to bow assembly 238.

For example, bow assembly 238 can comprise bow 12A where load sensor(s) 150 comprise load sensor(s) 212 and/or other load sensors disposed on bow 12A. One or more motion sensor(s) 170 can also be disposed on bow 12A. Bow assembly 238 can also comprise controller 152 for processing signals from sensors 150 and 170 and a battery 156 for energizing the electrical components. Controller 152 and battery 156 are positioned on bow 12A. A hard wire connection 158 can connect controller 152 or mobile computer 56. Alternatively, transmitter 154 disposed on bow 12A can facilitate wireless communication between controller 152 and mobile computer 56. Where desired, output device 166 can be disposed on glove 110B.

Bow assembly 238 operates with mobile computer 56 is the same way bow hand glove assembly 54 operates with mobile computer 56. As such, the prior discussion of the operation between bow hand glove assembly 54 and mobile computer 56 is applicable to and is incorporated herein as discussion for operation between bow assembly 238 and mobile computer 56. Furthermore, the discussion with regard to the block flow diagram depicted in FIG. 9 is also applicable to the use of bow assembly 238 except that now the measured load and motions in steps 184 and 198 are based on measurements from sensors on bow assembly 238. As such, the prior discussion of the method of use of release hand glove assembly 52 made in association with FIG. 9 is applicable to and is incorporated herein as discussion of the method of use of bow assembly 238.

Figure 19:
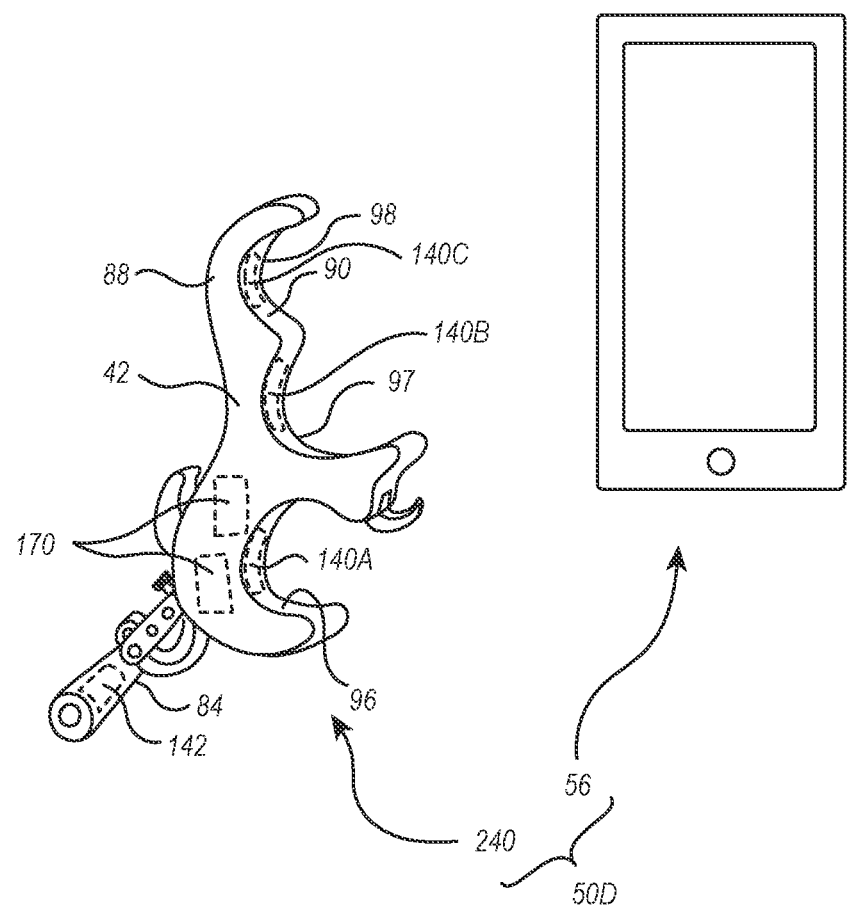
FIG. 19 is an alternative embodiment of an archery sensory feedback system wherein sensors are located on a release aid.

Depicted in FIG. 19 is an archery sensory feedback system 50D which comprises a release aid assembly 240 and mobile computer 56. Release aid assembly 240 includes release aid 42 previously discussed with regard to FIG. 4 and other electrical components disposed thereon. Specifically, load sensors 140A-C are disposed on front face 90 of handle 88 of release aid 42 within grooves 96-98, respectively. As such, fingers 66-67 of release hand 40 overlay and press against load sensors 140A-C as release hand grasps release aid assembly 240 and uses assembly to retract bow string 24. Accordingly, just as load sensors 140A-C disposed on release hand glove assembly 52 sense the load produced between fingers 66-67 and release aid 42 as bow string 24 is retracted, as previously discussed, load sensors 140A-C of release aid assembly 240 also sense the load produced between fingers 66-67 and release aid 42 as bow string 24 is retracted.

Furthermore, load sensor 142 can be positioned on trigger 84 of release aid 42. Load sensor 142 is positioned to sense the load applied to trigger 84 as trigger 84 is depressed by thumb 65 of release hand 40 during the shooting of bow 12. Other load sensors can also be positioned on release aid 42.

Release aid assembly 240 further includes one or more motion sensors 170, previously discussed, applied to release aid 42. Just as motion sensors 170 were used on release hand glove assembly 52 to determine movement of release hand 40, motion sensor(s) 170 on release aid 42 can be used to determine movement of release aid 42 which in turn relates to movement of release hand 40. The one or more motion sensors 170 can be placed at any desired location on release aid 42. It is appreciated that release aid assembly 240 can include only one or more load sensors, only one or more motion sensors, or both one or more load sensors and motion sensors.

Figure 20:
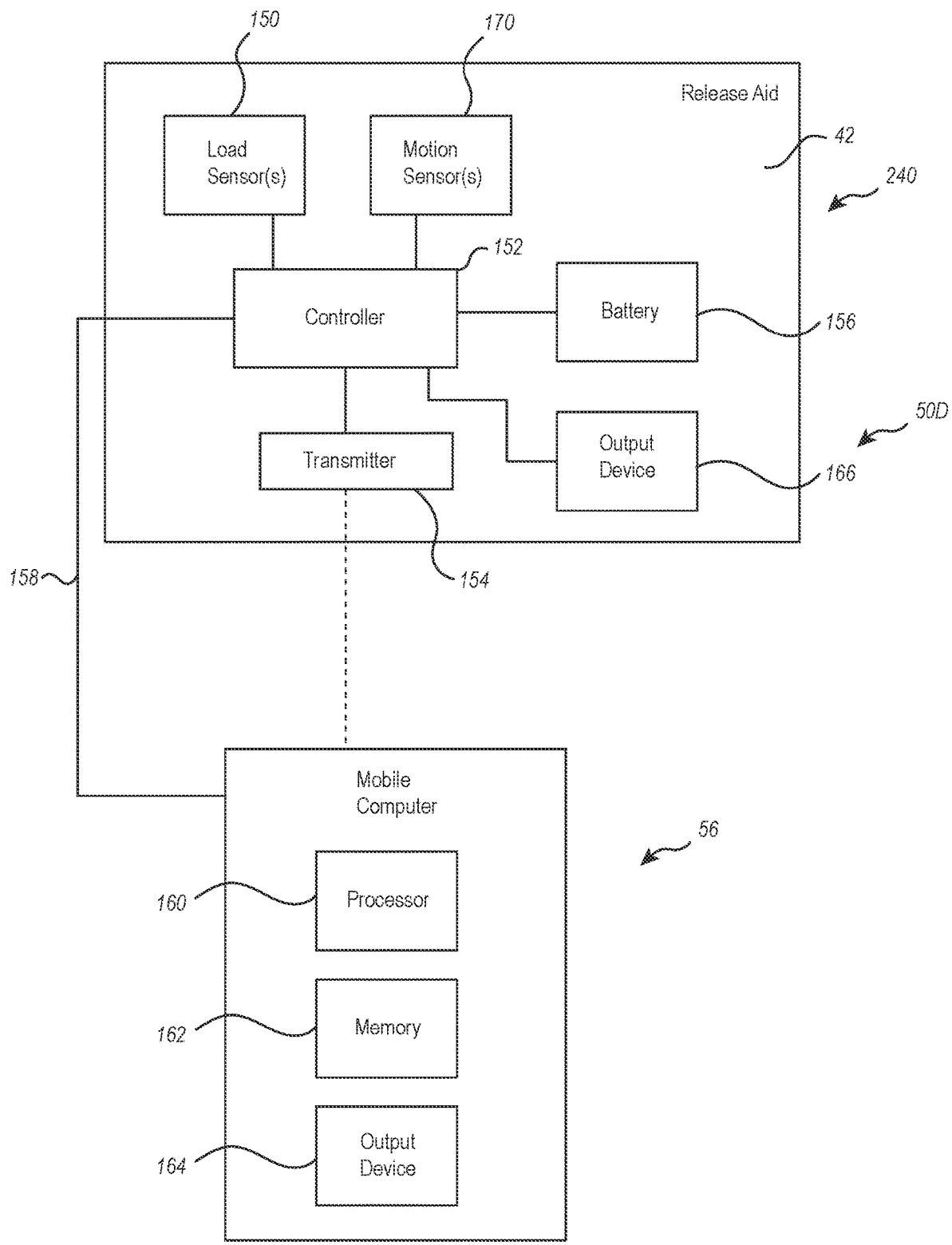
FIG. 20 is a schematic representation of the archery sensory feedback system shown in FIG. 19.

FIG. 20 is a schematic representation of archery sensory feedback system 50D where system 50 comprises release aid assembly 240 used in combination with mobile computer 56. Release aid assembly 240 can have the same electrical components, same modifications and be used in the same way as previously discussed with release hand glove assembly 52. As such like elements between release hand glove assembly 52 and release aid assembly 240 are identified by like reference characters and the prior discussion of configuration, modifications, alternative embodiments and operation of release hand glove assembly 52 are incorporated into and are applicable to release aid assembly 240.

For example, release aid assembly 240 can release aid 42 where load sensor(s) 150 comprise load sensor(s) 140 and 142 and/or other load sensors disposed on bow 12A. One or more motion sensor(s) 170 can also be disposed on release aid 42. Release aid assembly 240 can also comprise controller 152 for processing signals from sensors 150 and 170 and a battery 156 for energizing the electrical components. Controller 152 and battery 156 are positioned on release aid 42. A hard wire connection 158 can connect controller 152 to mobile computer 56. Alternatively, transmitter 154 disposed on release aid 42 can facilitate wireless communication between controller 152 and mobile computer 56. Where desired, output device 166 can be disposed on release aid 42.

Release aid assembly 240 operates with mobile computer 56 is the same way release hand glove assembly 52 operates with mobile computer 56 as previously discussed. As such, the prior discussion of the operation between release hand glove assembly 52 and mobile computer 56 is applicable to and is incorporated herein as discussion for operation between release aid assembly 240 and mobile computer 56. Furthermore, the discussion with regard to the block flow diagram depicted in FIG. 9 is also applicable to the use of release aid assembly 240 except that now the measured load and motions in steps 184 and 198 are based on measurements from sensors on release aid assembly 240. As such, the prior discussion of the method of use of release hand glove assembly 52 made in association with FIG. 9 is applicable to and is incorporated herein as discussion of the method of use of release aid assembly 240.

The various archery sensory feedback systems discussed herein achieve a number of unique benefits. For example, they enable an archer to continually track movement of the archer's release hand and/or bow hand while shooting the bow. In addition, the archery sensory feedback systems enable an archer to continually track forces produced by or on the archer's release hand and/or bow hand while shooting the bow. Such forces can be tracked at multiple different locations on the hands and at different times during shooting of the bow. Select forces can also be isolated for analysis.

The foregoing sensing enables an archer to both know specific force and movement values regarding their shooting of a bow and also enables them to track actual values and compare them to predetermined preferred values. This ability to compare enables an archer to isolate problems with a shot and to repeatedly practice shots with the ability to ensure that they are being performed properly. In view of the foregoing, embodiments of the inventive sensory feedback system enable an archer to address each of the problems raised in the background section herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An archery training method comprising:
    measuring a load applied to a bow hand holding a bow or applied to a release hand drawing a bow string of the bow, the measuring being performed while the bow is held by the bow hand and the string is drawn to a cocked positioned by the release hand for firing an arrow;
    comparing through a computer processor the measured load to a predetermined value; and
    activating an output device to generate a notice based on the comparison between the measured load and the predetermined value.

2. The archery training method as recited in claim 1, wherein the step of measuring the load comprises:
    securing a first load sensor to the bow hand so that the first load sensor is positioned over at least a portion of the palm of the bow hand; and
    using the first load sensor to measure the load applied to the palm of the bow hand holding the bow while a bow string is in the cocked position.

3. The archery training method as recited in claim 1, wherein the step of measuring the load comprises using a load sensor disposed on a grip of the bow to measure the load applied to the palm of the bow hand holding the bow while the bow string is in the cocked position.

4. The archery training method as recited in claim 1, wherein the step of measuring the load comprises:
    securing a second load sensor to the release hand so that the second load sensor is positioned over one of the index finger, middle finger or ring finger of the release hand; and
    using the second load sensor to measure the load applied to the one of the index finger, middle finger or ring finger of the release hand produced by the bow string being in the cocked position.

5. The archery training method as recited in claim 1, wherein the step of measuring the load comprises using a load sensor disposed on an archery release aid engaging the bow string of the bow to measure the load applied to one of the index finger, middle finger or ring finger of the release hand by the by the bow string being in the cocked position.

6. The archery training method as recited in claim 1, wherein the step of measuring the load comprises:
    securing a third load sensor to a back side of the release hand, the back side of the release hand being pressed against a face of the user when the bow string is in the cocked position; and
    using the third load sensor to measure the load applied to the back side of the release hand as a result of the back side of the release hand being pressed against the face of the user when the bow string is in the cocked position.

7. The archery training method as recited in claim 1, wherein the notice comprises a visual, audio, and/or tactile feedback.

8. The archery training method as recited in claim 1, wherein the predetermined value comprises a value based on a prior measured load applied to the bow hand or the release hand while the bow string is in the cocked position.

9. The archery training method as recited in claim 1, further comprising:
    measuring a movement of the bow hand or release hand while the bow string is being drawn to the cocked position or released from the cocked position; and
    comparing through the computer processor the measured movement of the bow hand or the release hand to a predetermined value.

10. The archery training method as recited in claim 9, wherein the step of measuring comprises:
    securing an accelerometer or gyroscope sensor to the bow hand or the release hand; and
    using the accelerometer or gyroscope sensor to measure movement of the bow hand or the release hand while the bow string is being drawn to the cocked position or released from the cocked position.

11. An archery training method comprising:
    measuring movement of a bow hand or a release hand of an archer while the archer is drawing a bow string of a bow to a cocked position for firing an arrow or releasing the bow string from the cocked position, the movement being measured by an accelerometer or gyroscope sensor secured to the bow or to an archery release aid engaging the bow string of the bow;
    comparing through a computer processor the measured movement of the bow hand or the release hand to a predetermined value; and
    activating an indicator to generate a notice based on the comparison between the measured movement and predetermined value.

12. An archery training method comprising:
    tracking movement of a bow hand holding a bow or a release hand holding a bow string through the use an accelerometer or gyroscope sensor secured to the bow or to an archery release aid engaging the bow string of the bow, the tracking being performed while an archer is drawing the bow string to a cocked position for firing an arrow or releasing the bow string from the cocked position; and
    displaying on a display device a representation of the direction of movement of the bow hand or the release hand while an archer is drawing the bow string to the cocked position or releasing the bow string from the cocked position based on signals obtained from the accelerometer or gyroscope sensor.

\* \* \* \* \*